US005966242A

United States Patent [19]

Yamanaka

[11] Patent Number: 5,966,242

[45] Date of Patent: Oct. 12, 1999

[54] OPTICAL DEVICE AND HMD USING SAID OPTICAL DEVICE

[75] Inventor: Atsushi Yamanaka, Chiba, Japan

[73] Assignee: Sharp Kabushiki Kaisha, Osaka, Japan

[21] Appl. No.: 08/843,352

[22] Filed: Apr. 15, 1997

[30] Foreign Application Priority Data

Apr. 24, 1996 [JP] Japan .................................... 8-102826
Jan. 10, 1997 [JP] Japan .................................... 9-002718

[51] Int. Cl.[6] ............................ G02B 27/10; G02B 27/14

[52] U.S. Cl. ........................... 359/618; 359/627; 359/629

[58] Field of Search ..................................... 359/618–640

[56] References Cited

U.S. PATENT DOCUMENTS

| | | | |
|---|---|---|---|
| Re. 27,356 | 5/1972 | La Russa | 359/630 |
| 4,093,347 | 6/1978 | La Russa | 359/630 |
| 4,785,053 | 11/1988 | Ito et al. | 528/146 |
| 5,149,771 | 9/1992 | Murata | 528/353 |
| 5,598,297 | 1/1997 | Yamanaka et al. | 359/462 |

FOREIGN PATENT DOCUMENTS

| | | |
|---|---|---|
| 0718645A2 | 6/1996 | European Pat. Off. . |
| 1-126620 | 5/1989 | Japan . |
| 8327940 | 12/1996 | Japan . |
| 8-327940 | 12/1996 | Japan . |

*Primary Examiner*—Georgia Epps
*Assistant Examiner*—Michael A. Lucas

[57] ABSTRACT

This invention is directed to provide a head-mounted display device (HMD) which is capable of providing a high-quality and impressive image with an improved S/N ratio through a super-wide-field-angle short-focus lens for obtaining wide-field-angle visual information. An optical device used for the HMD according to the present invention comprise: a reflecting and refracting means is made of copolymerized high-polymer material having positive and negative photoelastic coefficients against an internal stress; a first and second quarter-wave plates have refractive indexes in the direction of their thickness, which values are within the range from the minimal value and a maximal value of refractive indexes of respective quarter-wave plates; the quarter-wave plates are disposed so that their extension axes intersect each other at a right angle; first and second wideband-wave plates, each of which is prepared by bonding a half-wave plate to a quarter-wave plate at a suitable angle, are further provided; and optical elements are covered at their surfaces with anti-reflection coating or bonded to each other with optical adhesive.

24 Claims, 23 Drawing Sheets

QUARTER-WAVE PLATE 91
STRETCH-GIVING AXIS :-45 DEG.

HALF-WAVE PLATE 211
STRETCH-GIVING AXIS : −15 DEG.

QUARTER-WAVE PLATE 212
STRETCH-GIVING AXIS : −75 DEG.

OPTICAL DEVICE AND HMD USING SAID OPTICAL DEVICE

BACKGROUND OF THE INVENTION

Recently, a head mounted display (hereinafter referred to as HMD) has attracted public attention as an image display which can be used for representing visual information of virtual reality, remote control of a robot and so on. HMD devices of this type are required to have a high-resolution and wide-field-of-vision so as to provide video information with an enhanced impression of reality and presence. It should also be light and small so that a user may easily mount it on his or her body (particularly on the head) with no trouble. The HMD is a spectacle-like case mountable on the user's head, wherein paired back lights, liquid-crystal displays (LCDs) and lenses are disposed in the described order from the front external side of the case (FIG. 1). The viewer who wears the HMD on own head can view an image on the LCDs through the lenses in an enlarged scale, as if it were displayed on a large screen.

Recent rapid development of LCDs has provided miniaturized high-quality LCDs usable in HMD. However, an optical system that is another main component of a HMD has not sufficiently been improved with respect to saving in size and weight. HMDs have been mainly applied in the industrial fields, in particular, as devices for studying virtual reality. However, HMD devices find wide and increasing application for home-use game-machines, VTR displays and so on. Therefore, there is a keen interest in further development of more compact and light-weighted HMDs.

To solve the above-mentioned problems, the present applicant previously proposed an optical device which is filed in Japanese Patent Application No. 7-231368. This optical device will be described below.

Coordinates used for explaining the optical device is defined as follows: an axis being normal to a sheet plane and directed this side is x-axis, an axis being parallel to the sheet plane and directed upward is y-axis and an axis being normal to x-axis and y-axis and directed to the right is z-axis (FIG. 3A). A rotation angle is an angle formed between y-axis and x-y plane when observing along z-axis (FIG. 3B). The direction of clockwise rotation is defined as a positive rotational direction.

The optical device comprises a liquid crystal display (LCD) panel, a first polarizer plate, a plano-convex lens having a half-mirror coating on its convex surface, a first quarter-wave plate, a half-mirror, a second quarter-wave plate and a second polarizer plate, all of which are arranged in the described order from the incident side so that they are included in the x-y plane and are normal to the optical axis of the optical unit (FIG. 4).

The directions of the optical elements (components) are as follows (FIG. 5): the first and second polarizer plates are disposed to direct transmitting polarized light to the y-axis direction and the first and second quarter-wave plates are disposed so that their extension axes make an angle of −45 degrees with the y-axis.

Incident light from the LCD disposed at the left side enters into the first polarizer plate whereby it is polarized to the y-axis direction. The polarized light passes a half-mirror-coated plano-convex-lens and then the first quarter-wave plate whereby the plane-polarized light is converted into circularly polarized light.

The light is then divided by the half-mirror into directly transmitting light 41 and reflected light 42. The direct light is converted again by the second quarter-wave plate from the circularly polarized light into the plane-polarized light. As the respective stretch-giving axes of the first quarter-wave plate and the second quarter-wave plate have the same direction the light is the same as passed through a half-wave plate. The plane-polarized light is rotated by 90° and directed in the x-axis direction.

Namely, the light alters its polarization direction by 90° at every time when passing the first and second quarter-wave plates and is, therefore, absorbed by the second polarizer plate. Thus, noise light from the LCD can be shut off before reaching the user's eye.

On the other hand, the reflected light from the half-mirror passes again the first quarter-wave plate whereby it is converted to plane-polarized light directed in the x-axis direction. The plane-polarized light passes the plano-convex lens and is reflected from the half-mirror coating thereof. The polarization direction of the light is not changed by reflection. Accordingly, the light is left as plane-polarized.

The light passes for the third time the plano-convex lens and then the first quarter-wave plate whereby it is converted to circularly polarized light, it then enters into the half-mirror and is divided into two parts: one passes the half-mirror and the other is reflected therefrom. The transmitted light then passes the second quarter-wave plate whereby it is converted to plane-polarized light.

In contrast to the aforementioned direct light, the plane-polarized light is confined to the y-axis direction since it passed through the first quarter-wave plate two more times. Consequently, it passes the second polarizing plate and reaches the user's eye.

While the light passes three times through the plano-convex lens, it is subjected to refracting actions of the lenses and actions of the half-mirror-coated concave mirror. Therefore, it gains an optical power several times larger than light passed through a single plano-convex lens. In other words, it is possible to obtain the same optical power by using an optical unit having several times reduced thickness and weight.

All optical elements are bonded to each other or disposed close to each other to compose a thin optical unit (FIG. 6).

Accordingly, a HMD is particularly requested to have a reduced thickness (protrusion from the user's face) and a reduced weight loading the user's face so as to be comfortably used. The above-described optical device is effectively usable for HMDs.

However, the optical device (hereinafter described as the earlier optical device or the earlier device) filed in Japanese Patent Application No. 7-231368 has such a drawback that each optical element has not ideal characteristic and produces unnecessary noise light, decreasing a S/N-ratio of the optical system. Noise rays are produced for the following six main reasons:

(1) The first reason is birefringence (double refraction) in the plano-convex lens. This lens is preferably made of plastic material to have a reduced weight. However, many plano-convex lenses made of conventional optical plastics (e.g., acrylic resin) have birefringence caused by internal strain produced in manufacturing process. The plano-convex lens having the birefringence causes light passing therethrough to change its polarized condition. Consequently, noise rays from the LCD directly reach the user's eye and necessary rays of light (hereinafter referred to as signal light) are disturbed, resulting in decreasing a signal-to-noise ratio of an image to be displayed.

(2) The second reason is a change of retardation characteristic of the first and second quarter-wave plates with an angle of light passing therethrough. When the angle of passing light differs from the designed value, the retardation value shifts from ¼ of the wavelength. Therefore, the light can not be shut off or transmitted as designed. Consequently, similarly to the case of reason 1, some rays of light from the LCD may directly reach the user's eye as noise light.

An anisotropic body such as a quarter-wave plate may have different refractive indexes in different directions, which is expressed by using a refractive index ellipsoid that is as follows (FIG. 10):

In a plane of a quarter-wave plate, there is set a coordinate system wherein X-axis corresponds to the direction of a stretch-giving axis of the plate, Y-axis is normal to X-axis and Z-axis is normal to X-axis and Y-axis and extends in the plate thickness direction (FIG. 9).

Now suppose light propagating along Z-axis. Usually, this light is expressed as a synthesis of plane-polarized light in the direction of X-axis and plane-polarized light in the direction of Y-axis. Refractive indeces mil, of two plane-polarized rays in the quarter-wave plate made of anisotropic material are different from each other and expressed as $n_x$ and $n_y$ (FIG. 9A).

Further, light propagating along X-axis and plane-polarized in the direction of Z-axis is supposed and its refractive index is expressed as $n_z$ (FIG. 9B). An ellipsoid shown in FIG. 10 is obtained using the refractive indeces mil, according to the following expression:

$$(x^2/n_x^2+y^2/n_y^2+z^2/n_z^2)=1 \quad \text{(Equation 1)}$$

The ellipsoid is so called refractive index ellipsoid that can be used for approximately determining refractive indeces mil, of light rays propagating in ordinary directions except the above-mentioned directions as follows:

Light that propagates in a direction A, by way of example, is considered (FIG. 11). In this case, a line that intersects the refractive index ellipsoid and a plane passing an origin and being normal to the light propagation direction A is first.

This determined line as above-mentioned describes an ellipse whose major axis and minor axis indicate two respective axes of plane-polarized rays into which incident light is split. Refractive indeces mil, of these two plane-polarized rays are determined by lengths of the ellipse major and minor axes respectively. This refractive index ellipsoid is very useful for determining a refractive index of a retardation plate for any light passing in any direction therein.

Many conventional quarter-wave plates are sheets made of polycarbonate stretched in a certain direction. Many of these sheets have a refractive index ellipsoid which characteristics of $n_x>n_z=n_y$ as conventional quarter-wave (FIG. 12).

The quarter-wave plate of the above-mentioned characteristic can give an adequate retardation to light passing the plate (sheet) at right angles but it alters retardation of light passing therethrough at an oblique angle. For example, a retardation for light entering obliquely into the quarter-wave plate in a plane Z-X is calculated by using the refractive index ellipsoid as follows:

$$\left\{\sqrt{1/(\cos^2\theta/n_x^2+\sin^2\theta/n_z^2)}-n_y\right\}\times d/\cos\theta\times 1/L \quad \text{(Equation 2)}$$

In Equation 2, θ is an oblique angle measured from a normal line, d is a thickness of the quarter-wave plate (=60 micrometers), $n_x$ is a refractive index in the direction X (=1.5922), $n_y$ is a refractive index in the direction Y (=1.5900), $n_z$ is a refractive index in the direction Z (=1.5900) and L is a wavelength of the light (=520 nanometers).

The equation 2 is calculated by putting numerical values therein. As is apparent from a change of retardation with incident angles measured from the normal, retardation is decreased twice at an incident angle of 60° (FIG. 13) Accordingly, an optical system using the quarter-wave plate allows slant rays to pass at a side of the visual field and fall into the user's eye and absorb a part of necessary signal light, resulting in decreasing a S/N ratio of a display image.

(3) The third reason is a change of retardation characteristics of the first and second quarter-wave plates for wavelengths. If the wavelength of each quarter-wave plate does not match with the designed value, its retardation deviates from ¼ of the wavelength and the plate can not shut off and transmit light rays as designed. Consequently, a part of light from the LCD, similar to the first and second cases, directly reaches the user's eye as noise light to be further described below in detail (FIG. 14):

The earlier optical device disposes the first and second quarter-wave plates so that their stretch-giving axes match with each other and incline at 45° to a transmission axis of the first polarizer plate. In this unit construction, the first quarter-wave plate and the second quarter-wave plate can cooperatively act as a half-wave plate. Consequently, the light from the first polarizer plate passes the first and second quarter-wave plates and emerges therefrom as polarized in direction normal to the transmission axis of the first quarter-wave plate.

To absorb this light that may reach the user's eye directly from the LCD, the second polarizer plate is disposed so that its transmission axis is coincident with the transmission axis of the first polarizer plate. The desired purpose can be realized if the quarter-wave plates have an ideal quarter-wave retardation for any wavelength.

However, practical quarter-wave plates vary retardation with wavelengths. By way of example, wavelength characteristics of polycarbonate usually used as a quarter-wave plate has a specific relation between a wavelength of transmitted light and retardation of the light (in percentage to wavelength) (FIG. 15).

The first and second quarter-wave plates having the characteristics are disposed with their stretch-giving axes being in line. In this case, total retardation characteristic of the first and second quarter-wave plates may remain a change of retardation depending upon wavelengths. In particular, blue light having a short wavelength suffers retardation by b ¾ of the wavelength (FIG. 16).

Accordingly, the second polarizer plate disposed after the second quarter-wave plate can not absorb all rays of light, allowing blue noise light to reach the user's eye. As the combined retardation of two quarter-wave plates varies with wavelengths of light rays, light rays pass the second polarizer plate and reach the user's eye as noise light.

A function of a simple quarter-wave plate is described below in detail by using a Poincare's sphere. The Poincare's sphere is a system indicating polarization of light by points on a sphere (FIG. 17). If this sphere is regarded as the earth, points corresponding to the north pole and the south pole indicate counterclockwise circularly polarized light and a clockwise circularly polarized light respectively. A point on the equator relates to plane-polarized light and a longitude on the equator corresponds to twice an angle of the plane-polarized light.

Accordingly, if a longitude in a -Z-axis direction is defined 0, a point on the equator in a Z-axis direction represents a vertical straight line and -X-axis direction represents plane-polarized light in a 45-degree direction. Similarly, a x-axis direction indicates a plane-polarized light in a horizontal direction and a x-axis direction indicates plane-polarized light in a −45-degree direction. A space between the equator and the north pole represent an elliptically polarized light. Thus, any polarized light can be expressed by a point on the Poincare's sphere.

The function of a retardation plate is expressed as an effect of rotating the Poincare's sphere by a retardation value measured in terms of angles. In this case, a rotation axis is defined as a straight line jointing a center of the Poincare's sphere with a point on the equator, which corresponds to a doubled longitude degree in the optical axis direction of the retardation plate.

A simple quarter-wave plate used in the conventional optical unit is now examined (FIGS. 18A and 18B). A standard polycarbonate-made quarter-wave plate is disposed with its stretch-giving axis disposed in a −45-degree direction in order to obtain counterclockwise circularly polarized light when a plane-polarized visible light (400 nm–700 nm) falls on the plate at an angle of 90° thereto.

The above-mentioned object can be realized if the retardation amount of the quarter-wave plate is always a quarter-wavelength to the incident light wavelength. However, an actually measured retardation of polycarbonate-made quarter-wave plates shows a quarter-wave retardation at the designed wave-length (500 nm) but an excess retardation with shorter wavelengths and an insufficient retardation with longer wavelengths.

The same facts can be explained by using a Poincare's sphere (FIG. 19). A plane-polarized incident light that is polarized in a vertical direction is expressed by a point A on the equator. An optical axis of a quarter-wave plate is expressed by a straight line and its activity is expressed by rotating the Poincare's sphere about the straight line B (optical axis) according to the retardation amount (90 degrees for the quarter-wave plate).

Accordingly, the point A is transferred to the north pole point C for light of the designed wavelength to form a complete circularly-polarized light, but the point A is transferred to a point D for light of shorter wavelength because of an excess retardation amount or to a point E for light of longer wavelength because of an insufficient retardation amount. Thus, light whose wavelength is other than the designed wavelength is converted to (not-circularly) elliptically polarized light.

There shows a result analyzing a ratio of circularly-polarized rays in output light of this simple quarter-wave plate (FIG. 20). This shows that the simple quarter-wave plate has different ratios of circularly-polarized rays in output light, which amount varies with different wavelengths. The earlier optical device using the simple quarter-wave plates has such a spectral transmittance characteristic of signal light where a large dispersion of visible light transmittance is observed with a particularly low transmittance of blue light and red light.

Consequently, the earlier optical device using the simple quarter-wave plates produces noise rays because the quarter-wave plates may produce elliptically polarized light.

(4) The fourth reason is that unnecessary reflection of light occurs between the plano-convex lens and the half-mirror (FIG. 22). This unnecessary reflection of light may take place at both surfaces of the first quarter-wave plate and at the user's side surface of the plano-convex lens. Noise light produced from the unnecessary reflection is polarized in the same way as the signal light, passes the second polarizer plate and reaches the user's eye. Light may be usually reflected by 5% from the surfaces, not coated with an anti-reflection film, of the plano-convex lens and the first quarter-wave plate. In this case, reflected noise rays amounts to 15% of the light.

(5) The fifth reason is the light reflection from the LCD (FIG. 23). A half (50%) of light from the LCD is reflected by the plano-convex lens and returns to the LCD. If the reflected light is further reflected by the LCD, it may reach the user's eye as a noise component of signal light. Usually, the LCD with a black matrix without anti-reflection coating may reflect 25% of the reflected light, producing unnecessary reflected light, i.e., noise light that amounts 12.5% (50%×25%) in relation to signal light.

(6) The sixth reason is such that light is reflected from rear surfaces of the second quarter-wave plate, the second polarizer plate and the half-mirror (FIG. 24). Signal light having passed through the half-mirror may be doubly reflected and become a noise light that produces a ghost image. Furthermore, external reflected light may fall on the user's eye, resulting in decreasing the contrast of a formed image.

SUMMARY OF THE INVENTION

The present invention relates to an optical system adapted to use in an image display device and, more particularly, to a small light-weighted super-wide-angle optical device and a HMD using the optical system.

The present invention was made to provide a short focal optical device having a super-wide-field-of-vision for obtaining a wide-angle visual information with an improved S/N-ratio and a HMD using the optical device, which can provide a high-quality image that may give an observer an increased feeling of his presence therein.

(1) An object of the present invention is to provide an optical device which uses reflecting and refracting means having a half-mirror coating, which is made of a copolymerized macromolecular material having positive and negative photoelastic coefficients relative to an internal stress. Namely, adaptive copolymerization of the macromolecular materials eliminates the possibility of double refraction.

The reflecting-refracting means allow light to pass therethrough without being disturbed in its polarized state, eliminating the possibility of directly transmitting noise light from the LCD to the user's eye as be seen in the earlier development case (FIG. 7). Thus, signal light is not affected by the noise light and can produce an image with an improved S/N-ratio.

(2) Another object of the present invention is to provide an optical device mentioned above (1), wherein the first and second quarter-wave plates have refractive power in their thickness direction, which value lies between a maximal refractive index and a minimal refractive index in the plate surface direction.

Thus the first quarter-wave plate and the second quarter-wave plate can suppress a change in retardation of light slanted into respective plates, thus reducing noise rays that may obliquely enter into the user's eye and surrounds an image produced by signal light.

(3) Another object of the present invention is to provide an optical device mentioned above (1), wherein the first and second quarter-wave plates are disposed with their stretch-giving axes intersecting with each other at right angles.

The first and second quarter-wave plates thus arranged can cooperatively cancel the retardation of light passing therethrough. Namely, light from the first polarizer plate passes the first and second quarter-wave plates and emerges therefrom as polarized in a direction corresponding to the transmission axis direction of the first polarizer plate. Thus the second polarizer plate disposed with its transmission axis intersecting at right angles with the transmission axes of the first polarizer plate can absorb noise light that may be directly transmittable from the LCD to the user's eye.

In the optical device according to the present invention, actual quarter-wave plates, each of which may change retardation of light depending on wavelengths, can cancel each other by their wavelength-dependent characteristics so that light having passed the plates may be absorbed by the second polarizer plate. In comparison with the earlier optical device (FIG. 14) wherein the first and second quarter-wave plates are disposed with their stretch-giving axes being parallel to each other, the optical device according to the present device can produce an image of an improved S/N-ratio by reducing noise rays.

(4) Another object of the present invention is to provide an optical device mentioned above (1) to (3), wherein the first polarizer plate, the reflecting-refracting means, the first quarter-wave plate, the half-mirror, the second quarter-wave plate and the second polarizer plate are disposed in the described order from the incident side.

In this arrangement, the second quarter-wave plate and the second polarizer plate cooperatively work as a circularly polarizer plate that can absorb external noise light reflected from the half-mirror, improving a S/N-ratio of an image formed by signal light having passed the device.

(5) Another object of the present invention is to provide an optical device mentioned above (1) to (3), wherein the first polarizer plate, the first quarter-wave plate, the reflecting-refracting means, the second quarter-wave plate, the half-mirror and the second polarizer plate are disposed in said order from the incident side.

In this arrangement, the first quarter-wave plate and the second polarizer plate cooperatively work as a circularly polarizer plate that can absorb light reflected from the reflecting and refracting means, thus reducing reflection from the LCD with improving a S/N-ratio of an image formed by signal light having passed the device.

(6) Another object of the present invention is to provide an optical device mentioned above (1), using, in place of conventional simple quarter-wave plates, wide-band-wave plates each of which is composed of a half-wave plate and a quarter-wave plate bonded to each other and having optical axes intersecting with each other.

The application of the above-mentioned wide-band-wave plates can considerably prevent a change of wavelength-dependent characteristics, thus improving a S/N-ratio in the range of wavelengths deviated from the designed value.

(7) Another object of the present invention is to provide an optical device mentioned above (6), wherein the quarter-wave plate and the half-wave plate are made of the same kind of material and at least either one of wave-plates satisfies a condition $n_x>n_z>n_y$ where $n_x$, $n_z$, and $n_y$ are refractive indexes in orthogonal directions and thickness direction, respectively, in a surface plane of the wave-plate.

The above-mentioned wave plate can prevent a change in retardation for incident light slanting thereinto, thus reducing the oblique light that may be visible by the user 's eye as noise at periphery of an image to be formed by signal light. This improves a S/N-ratio of an image to be displayed.

(8) Another object of the present invention is to provide an optical device mentioned above (6) or (7), wherein an angle "p" formed between optical axes of the quarter-wave plate and the half-wave plate is larger than 50 degrees and smaller than 70 degrees.

The above-mentioned construction can further improve the uniformity of wavelength characteristics of the wide-band-wave plate, thus increasing a S/N-ratio of an image to be provided by the system.

(9) Another object of the present invention is to provide an optical device mentioned above (6) to (8), wherein the first polarizer plate, the reflecting-refracting means, the first wide-band-wave plate, the half-mirror, the second wide-band-wave plate and the second polarizer plate are disposed in the described order from the incident side.

In this arrangement, the second wide-band-wave plate and the second polarizer plate cooperatively work as a wide-band-wave circularly-polarizer plate that can absorb wide-band external noise-light reflected from the half-mirror, thus improving a S/N-ratio of an image formed by signal light having passed the optical device.

(10) Another object of the present invention is to provide an optical device mentioned above (6) to (8), wherein the first polarizer plate, the first wide-band-wave plate, the reflecting-refracting means, the second wide-band-wave plate, the half-mirror and the second polarizer plate are disposed in the described order from the incident side.

In this arrangement, the first wide-band-wave plate and the first polarizer plate cooperatively work as a wide-band-wave circularly-polarizer plate that can absorb wide-band noise-light reflected from reflecting and refracting means, thus improving a S/N-ratio of an image formed by signal light having passed the device.

(11) Another object of the present invention is to provide an optical device mentioned above (1) to (10), wherein the optical components are coated each at either one side with an anti-reflection coat.

By doing so, it is possible to reduce an amount of noise light resulted from unnecessary reflection. As described before with reference to FIG. 22, a large amount of noise light may be produced if there is unnecessary reflection of light between the plano-convex lens and the half-mirror. According to the present invention, the reflecting and refracting means having an anti-reflection coat at its surface and the first quarter-wave plate with anti-reflection coats at both surfaces are used, thus sufficiently reducing an amount of noise light due to unnecessary reflection. (13) Another object of the present invention is to provide an optical device mentioned above (1) to (10), wherein any pair of the optical components is bonded to each other with adhesive for optics.

By doing so, it is possible to reduce an amount of noise light resulted from unnecessary reflection. As described before with reference to FIG. 22, a large amount of noise light may be produced if there is unnecessary reflection of light between the plano-convex lens and the half-mirror. According to the present invention, the reflecting-refracting means at its one side and the first quarter-wave plate at both sides are bonded with optical adhesive, thus sufficiently reducing an amount of noise light caused by unnecessary reflection.

(13) Another object of the present invention is to provide a HMD composed of an optical device mentioned in any one of (1) to (12) above, a back light and a liquid-crystal display (LCD).

The HMD has a wide-field angle and is thin and light to comfortably wear. It can provide a high-quality image.

(14) Another object of the present invention is to provide a HMD mentioned above (13), wherein a black-matrix contained in the liquid crystal display is provided with anti-reflection means.

This feature can reduce an amount of noise light caused by reflection on the LCD, thus realizing a further improved image quality of the HMD.

(15) Another object of the present invention is to provide a HMD mentioned above (13) or (14), wherein the back light has a substrate provided thereon with a light-emitting diode (LED) chip with an electrode and a fluorescent-material coat applied onto the substrate.

The HMD may be more compact and comfortable to use since the LED back light is thin and light and has no need of using an inverter. This LED back-light radiates a very small amount of heat and can easily attain a high brightness. The application of this back light enables the HMD to provide a bright image through its low-transmittance optical device wherein light from the back light a plurality of times passes the half-mirror.

(16) Another object of the present invention is to provide a HMD composed of an optical device mentioned in any one of (1) to (12) above and an electroluminescent display (ELD).

In comparison with a HMD with a LCD display, this HMD has no need of using a back light and may be further compact. However, the ELDs available at the present are mare inferior in resolution than the LCDs. Accordingly, the ELD is selected where the priority is given to saving in thickness of the HMD, rather than the resolution.

(17) Another object of the present invention is to provide a HMD mentioned above (17), wherein a black-matrix contained in the electroluminescent display is provided with anti-reflection means.

This feature can reduce an amount of noise light caused by reflection on the ELD, thus attaining a further improved image quality of the HMD.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

PREFERRED EMBODIMENTS OF THE INVENTION

Prior to explaining preferred embodiment of the present invention, known and earlier develop devices will be described below as references for the present invention.

Figure 1:
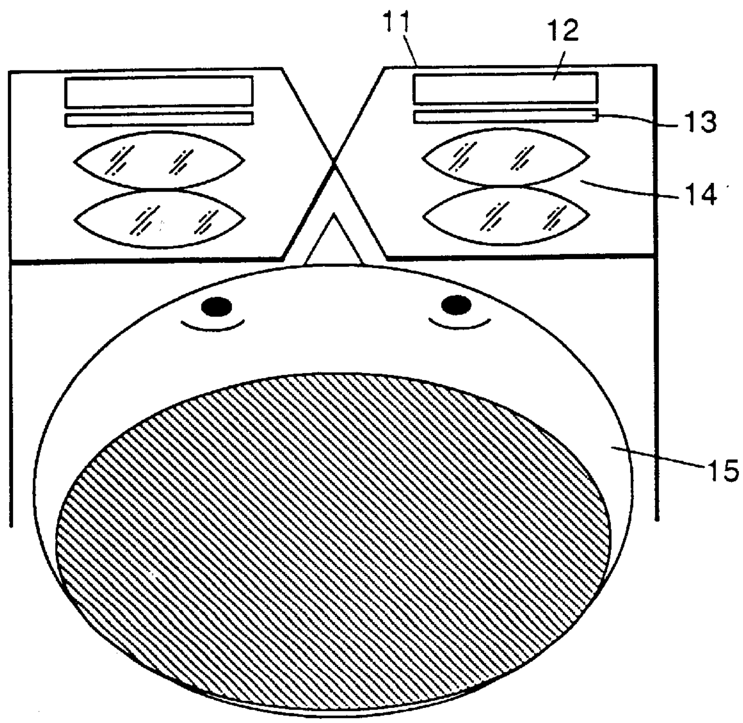
FIG. 1 is a schematic construction plan view of a conventional head-mounted display.

Recently, a HMD constituted as shown in FIG. 1 has attracted public attention as an image display which can be used for representing visual information of virtual reality, remote control of a robot and so on. HMD devices of this type are required to have so high-resolution and wide-field-of-vision that may provide video information with an enhanced impression of reality and the presence. It shall be also light and small so that a user may easily mount it on his or her body (particularly on the head) with no trouble.

As shown in FIG. 1, the HMD is a spectacle-like case 11 mountable on the user's head, wherein paired back lights 12, liquid-crystal displays (LCDs) 13 and lenses 14 are disposed in the described order from the front external side of the case 11. The viewer 15 who wears the HMD on own head can view an image on the LCDs through the lenses 14 in an enlarged scale as if it would be displayed on a large screen.

Recent rapid development of liquid crystal displays has provided miniaturized high-quality LCDs usable in HMD. However, an optical system that is another main component of a HMD has not sufficiently been improved with respect to saving in size and weight. HMDs have been mainly applied in the industrial fields, in particular, as devices for studying of virtual reality. However, HMD devices find wide and increasing application for home-use game-machines, VTR displays and so on. Therefore, there is a keen interest in further development of more compact and light-weighted HMDs.

Figure 2:
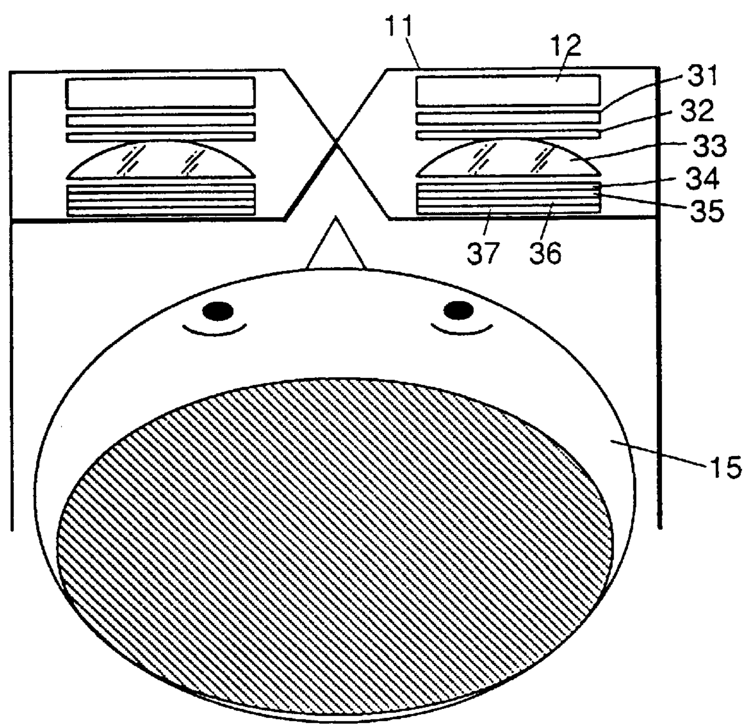
FIG. 2 is a schematic construction plan view of a head-mounted display using an earlier optical device.

To solve the above-mentioned problems, the present applicant previously proposed an optical device shown in FIG. 2, which is filed in Japanese Patent application No. 7-231368. This optical device will be described below.

Figure 3A:
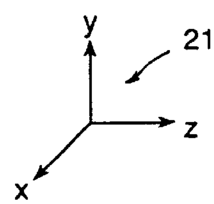
FIGS. 3A and 3B are views for explaining a definition of coordinate axes.
Figure 3B:
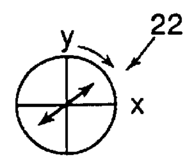

Referring to FIG. 3, coordinates 21 used for explaining the optical device is defined as follows: an axis being normal to the shown sheet plane and directed this side is x-axis, an axis being parallel to the sheet plane and directed upward is y-axis and an axis being normal to x-axis and y-axis and directed to the right is z-axis. A rotation angle 22 is an angle formed between y-axis and x-y plane when observing along z-axis. The direction of clockwise rotation is defined as a positive rotational direction.

Figure 4:
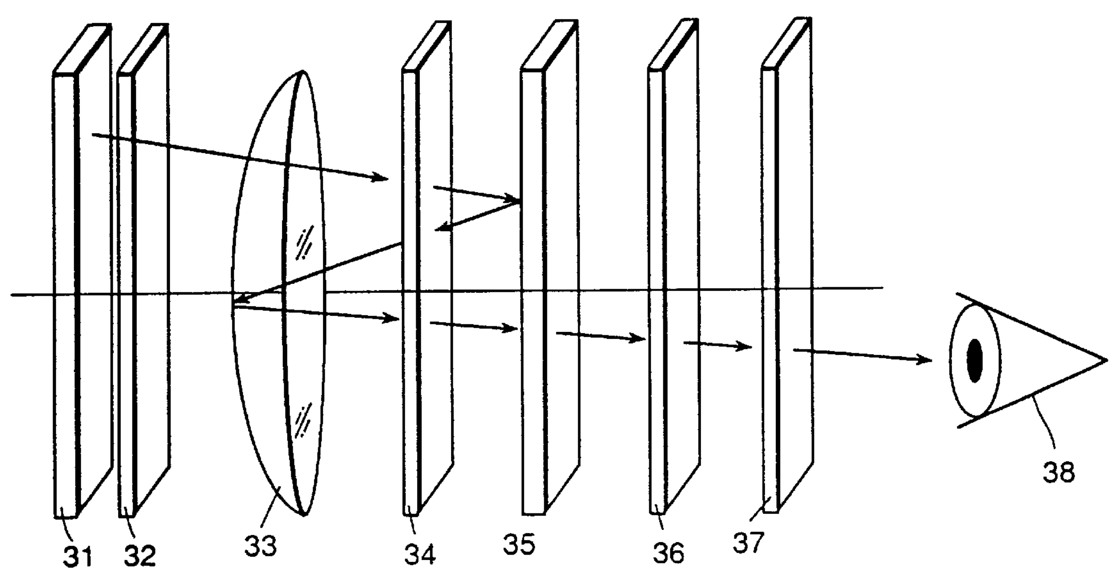
FIG. 4 is a construction view of an earlier optical device.

Referring to FIG. 4, a unit of the optical device comprises a liquid crystal display (LCD) panel 31, a first polarizer plate 32, a plano-convex lens 33 having a half-mirror coating on its convex surface, a first quarter-wave plate 34, a half-mirror 35, a second quarter-wave plate 36 and a second polarizer plate 37, all of which are arranged in the described order from the incident side (left side in FIG. 4) so that they are included in the x-y plane and are normal to the optical axis of the optical unit.

The directions of the optical elements (components) are as follows: the first and second polarizer plates 32, 37 are disposed to direct transmitting polarized light to the y-axis direction and the first and second quarter-wave plates 34, 36 are disposed so that their extension axes make an angle of −45 degrees with the y-axis.

FIG. 2 depicts how the optical unit acts on light rays. Incident light from the LCD 31 disposed at the left side enters into the first polarizer plate 32 whereby it is polarized to the y-axis direction. The polarized light passes a half-mirror-coated plano-convex-lens 33 and then the first quarter-wave plate 34 whereby the plane-polarized light is converted into circularly polarized light.

The light is then divided by the half-mirror 35 into directly transmitting light 41 and reflected light 42. The direct light 41 is converted again by the second quarter-wave plate 36 from the circularly polarized light into the plane-polarized light. As the respective stretch-giving axes of the first quarter-wave plate 34 and the second quarter-wave plate 36 have the same direction the light is the same as passed through a half-wave plate. The plane-polarized light is rotated by 90° and directed in the x-axis direction.

Namely, the light alters its polarization direction by 90° at every time when passing the first and second quarter-wave plates 34, 36 and is, therefore, absorbed by the second polarizer plate 37. Thus, noise light 41 from the LCD 31 can be shut off before reaching the user's eye 38.

On the other hand, the reflected light 42 from the half-mirror 35 passes again the first quarter-wave plate whereby it is converted to plane-polarized light directed in the x-axis direction. The plane-polarized light passes the plano-convex lens 33 and is reflected from the half-mirror coating thereof. The polarization direction of the light is not changed by reflection. Accordingly, the light is left as plane-polarized.

The light passes for the third time through the plano-convex lens 33 and then the first quarter-wave plate 34 whereby it is converted to circularly polarized light which further enters into the half-mirror 35 and is divided into two parts: one passes the half-mirror 35 and the other is reflected therefrom. The transmitted light then passes the second quarter-wave plate 36 whereby it is converted to plane-polarized light.

In contrast to the aforementioned direct light, the plane-polarized light is confined to the y-axis direction since it passed through the first quarter-wave plate two more times. Consequently, it passes the second polarizer plate 37 and reaches the user's eye 38.

While the light passes three times the plano-convex lens 33, it is subjected to refracting actions of the lenses and actions of the half-mirror-coated concave mirror and, therefore, gains an optical power several times larger than light passed through a single plano-convex lens. In other words, it is possible to obtain the same optical power by using an optical unit having several times reduced thickness and weight.

Figure 5:
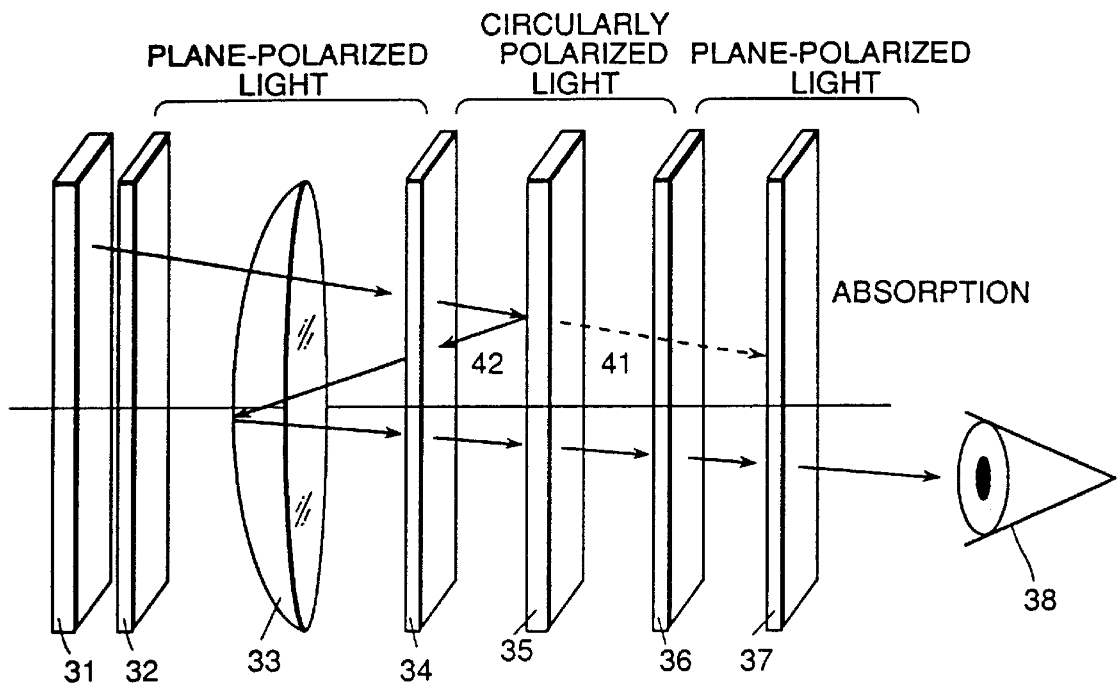
FIG. 5 is a view for explaining the operation of an earlier optical device.
Figure 6:
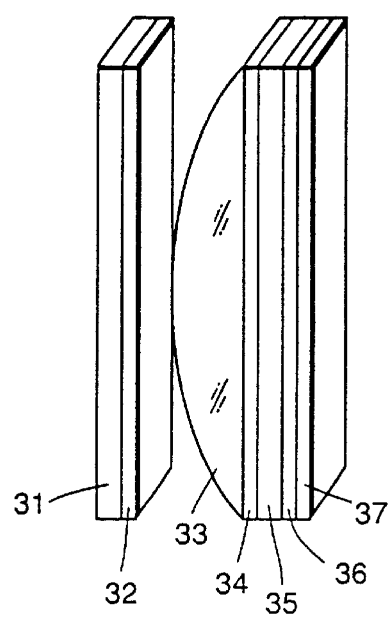
FIG. 6 is illustrative of an earlier optical device.

In FIG. 5, all optical elements are indicated separately for the sake of explanation. In practice, they are bonded to each other or disposed close to each other to compose a thin optical unit as shown in FIG. 6. These conditions are common to drawings used for the following explanation.

Accordingly, a HMD is particularly requested to have a reduced thickness (protrusion from the user's face) and a reduced weight loading the user's face so as to be comfortably used. The above-described optical device is effectively usable for HMDs.

Figure 7:
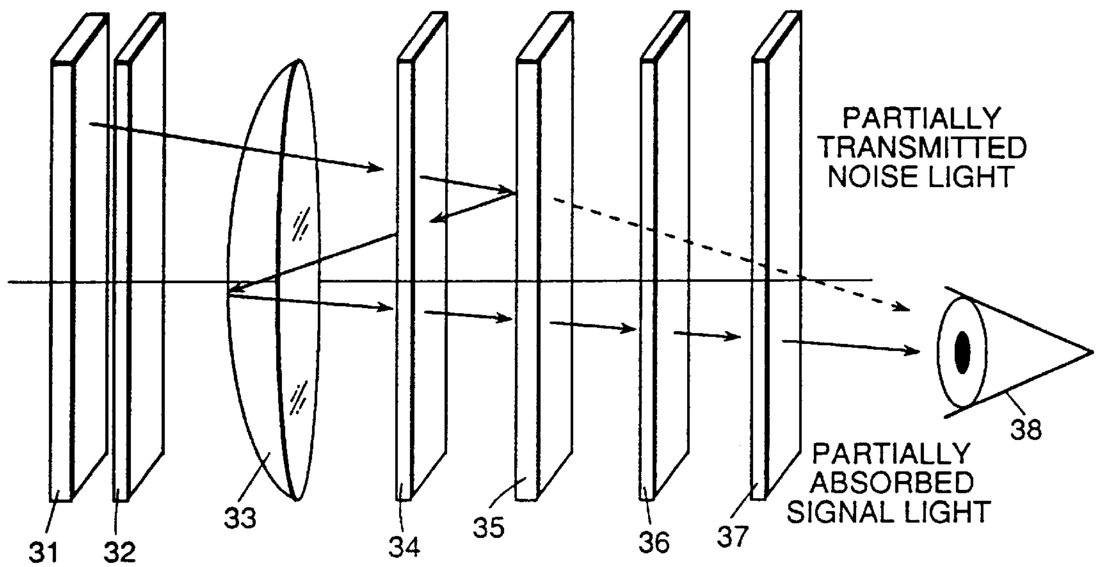
FIG. 7 is a view for explaining the operation of an earlier optical device.

However, the optical device (hereinafter described as the earlier optical device or the earlier device) filed in Japanese Patent Application No. 7-231368 has such a drawback that each optical element does not have ideal characteristics and produces unnecessary noise light, decreasing a S/N-ratio of the optical system. Noise rays are produced for the following six main reasons:

(1) The first reason is birefringence (double refraction) in the plano-convex lens 33. This lens is preferably made of plastic material to have a reduced weight. However, many plano-convex lenses made of conventional optical plastics (e.g., acrylic resin) have birefringence caused by internal strain produced in manufacturing process. The plano-convex lens 33 having the birefringence causes light passing therethrough to change its polarized condition. Consequently, noise rays from the LCD 31 directly reach the user's eye as shown in FIG. 7 and necessary rays of light (hereinafter referred to as signal light) are disturbed, resulting in decreasing a signal-to-noise ratio of an image to be displayed.

(2) The second reason is a change of retardation characteristic of the first and second quarter-wave plates 34, 36 with an angle of light passing therethrough. When the angle of passing light differs from the designed value, the retardation value shifts from ¼ of the wavelength. Therefore, the light can not be shut off or transmitted as designed. Consequently, similar to the case of reason 1, some rays of light from the LCD 31 may directly reach the user's eye as noise light.

Figure 8:
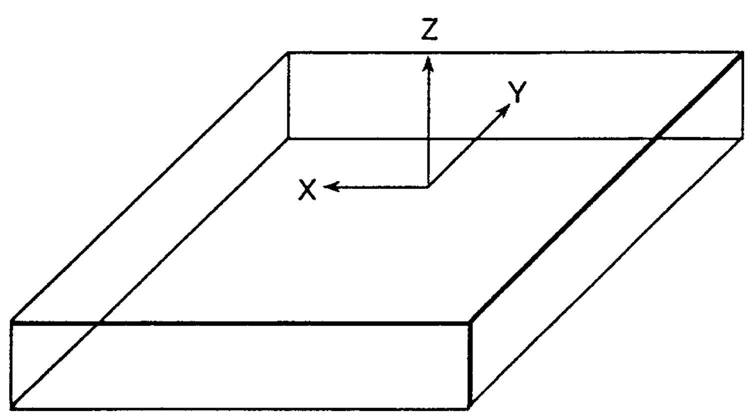
FIG. 8 is illustrative of a coordinate system of a wave-plate.

An anisotropic body such as a quarter-wave plate may have different refractive indexes in different directions, which is expressed by using a refractive index ellipsoid that is as follows:

In a plane of a quarter-wave plate, there is set a coordinate system shown in FIG. 8, wherein X-axis corresponds to the direction of a stretch-giving axis of the plate, Y-axis is normal to X-axis and Z-axis is normal to X-axis and Y-axis and extends in the plate thickness direction.

Figure 9A:
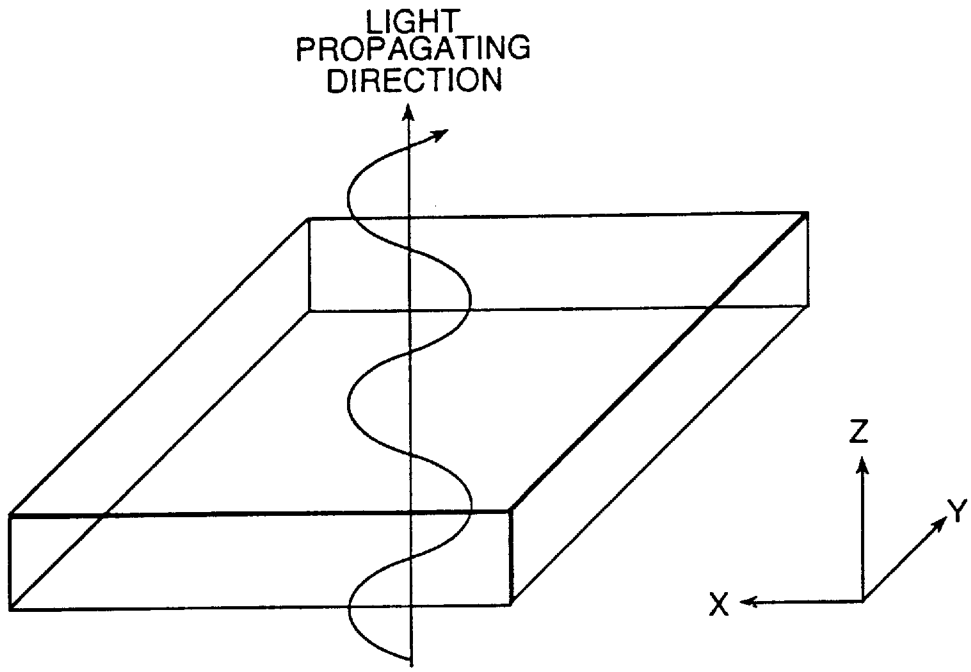
FIGS. 9A and 9B depicts the operation of a wave plate.

Now let suppose light propagating along Z-axis as shown in FIG. 9A. Usually, this light is expressed as a synthesis of plane-polarized light in the direction of X-axis and plane-polarized light in the direction of Y-axis. Refractive indexes of two plane-polarized rays in the quarter-wave plate made of anisotropic material are different from each other and expressed as $n_x$ and $n_y$.

Figure 9B:
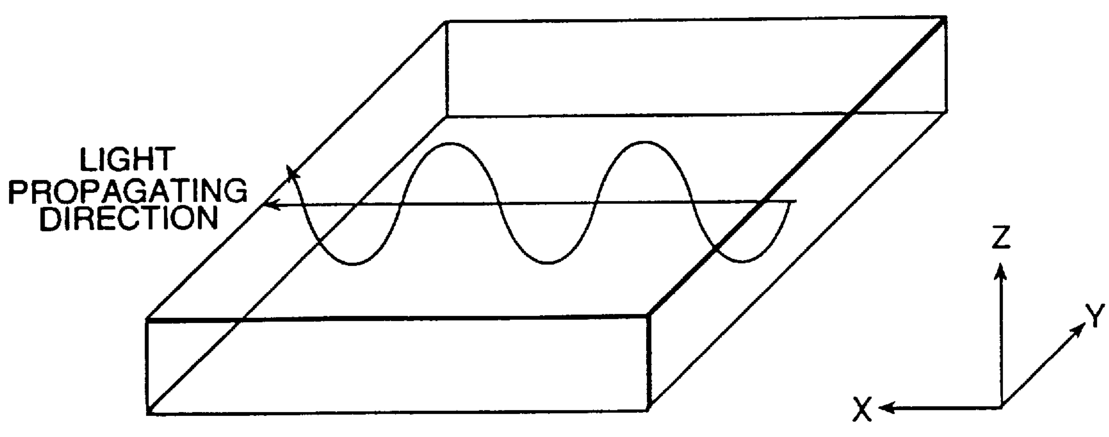
Figure 10:
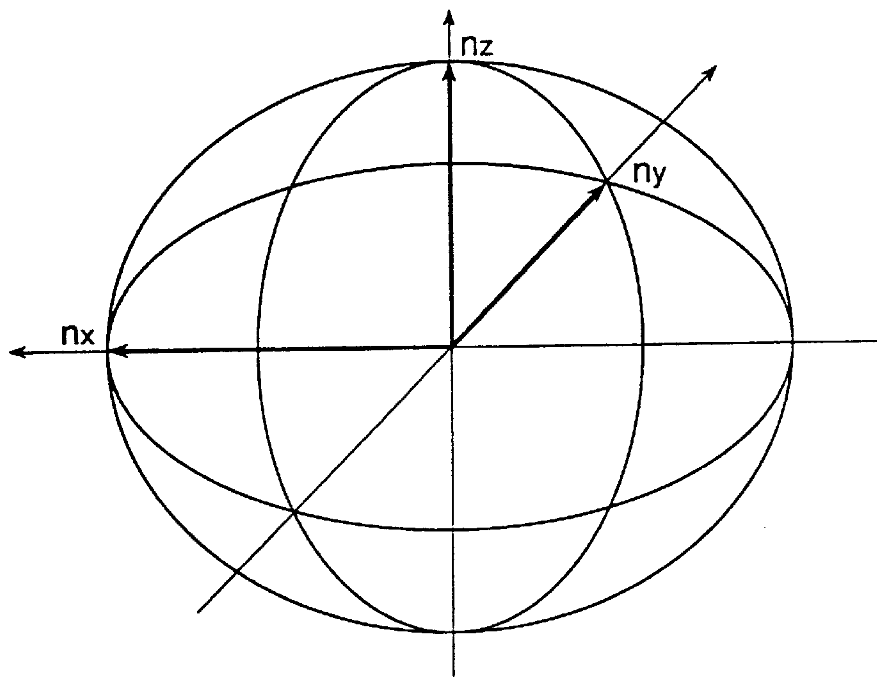
FIG. 10 depicts an ellipsoid of refractive indexes.

Further, light propagating along X-axis and plane-polarized in the direction of Z-axis is supposed as shown in FIG. 9B and its refractive index is expressed as $n_z$. An ellipsoid shown in FIG. 10 is obtained using the refractive indexes according to the following expression:

$$(x^2/n_x^2+y^2/n_y^2+z^2/n_z^2)=1 \qquad \text{(Equation 1)}$$

Figure 11:
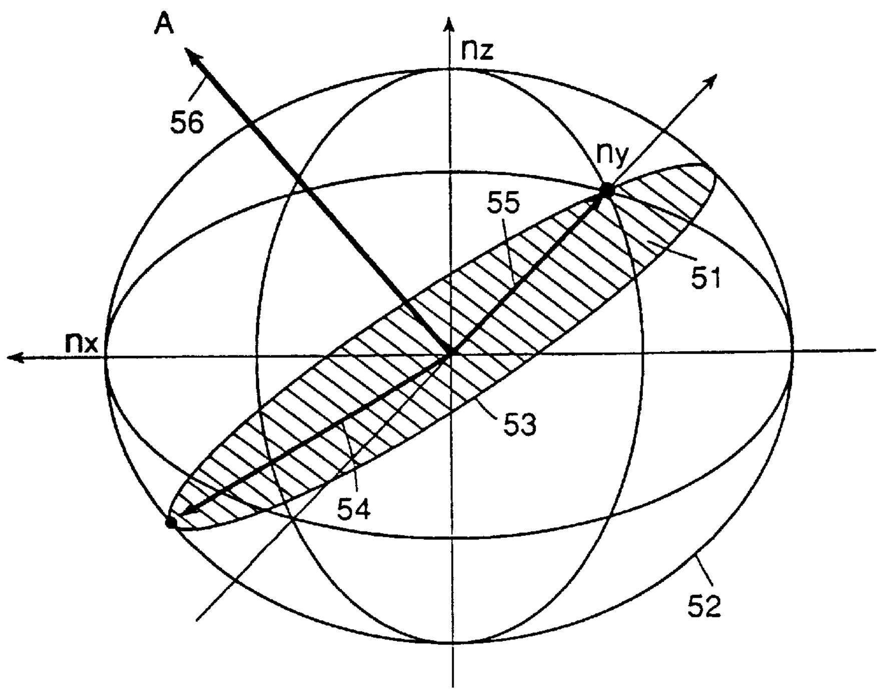
FIG. 11 depicts an ellipsoid of refractive indexes.

The ellipsoid is a so called refractive index ellipsoid that can be used for approximately determining refractive indexes of light rays propagating in ordinary directions except the above-mentioned directions as follows:

Light that propagates in the direction indicated by an arrow A (FIG. 11), by way of example, is considered. In this case, a line 53 that intersects the refractive index ellipsoid 52 and a plane 51 passing an origin and being normal to the light propagation direction A 56 is first.

This determined line as above-mentioned 53 describes an ellipse whose major axis 54 and minor axis 55 indicate two respective axes of plane-polarized rays into which incident light is split. Refractive indices of these two plane-polarized rays are determined by lengths of the ellipse major and minor axes 54 and 55 respectively. This refractive index ellipsoid is very useful for determining a refractive index of a retardation plate for any light passing in any direction therein.

Figure 12:
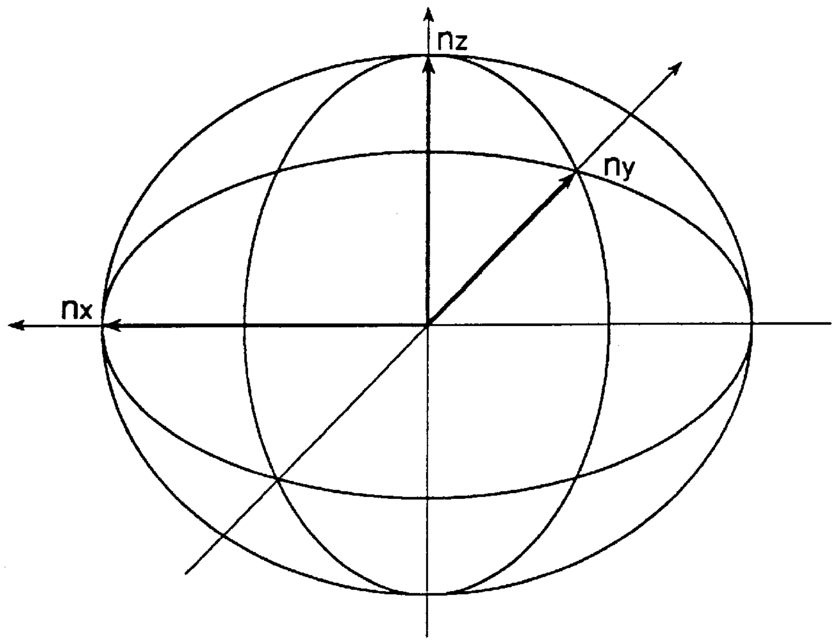
FIG. 12 depicts an ellipsoid of refractive indexes for a quarter-wave plate in an earlier optical device.

Many conventional quarter-wave plates are sheets made of polycarbonate stretched drawn in a certain direction. Many of these sheets have a refractive index ellipsoid as shown in FIG. 12. Namely, conventional quarter-wave plates possess characteristics of $n_x > n_z = n_y$ as conventional quarter-wave.

The quarter-wave plate of the above-mentioned characteristic can give an adequate retardation to light passing the plate (sheet) at right angles but it alters retardation of light passing therethrough at an oblique angle. For example, a retardation for light entering obliquely into the quarter-wave plate in a plane Z-X is calculated by using the refractive index ellipsoid as follows:

$$\left\{\sqrt{1/(\cos^2\theta/n_x^2+\sin^2\theta/n_z^2)}-n_y\right\}\times d/\cos\theta\times 1/L \qquad \text{(Equation 2)}$$

In Equation 2, θ is an oblique angle measured from a normal line, d is a thickness of the quarter-wave plate (=60 micrometers), $n_x$ is a refractive index in the direction X (=1.5922), $n_y$ is a refractive index in the direction Y (=1.5900), $n_z$ is a refractive index in the direction Z (=1.5900) and L is a wavelength of the light (=520 nanometers).

Figure 13:
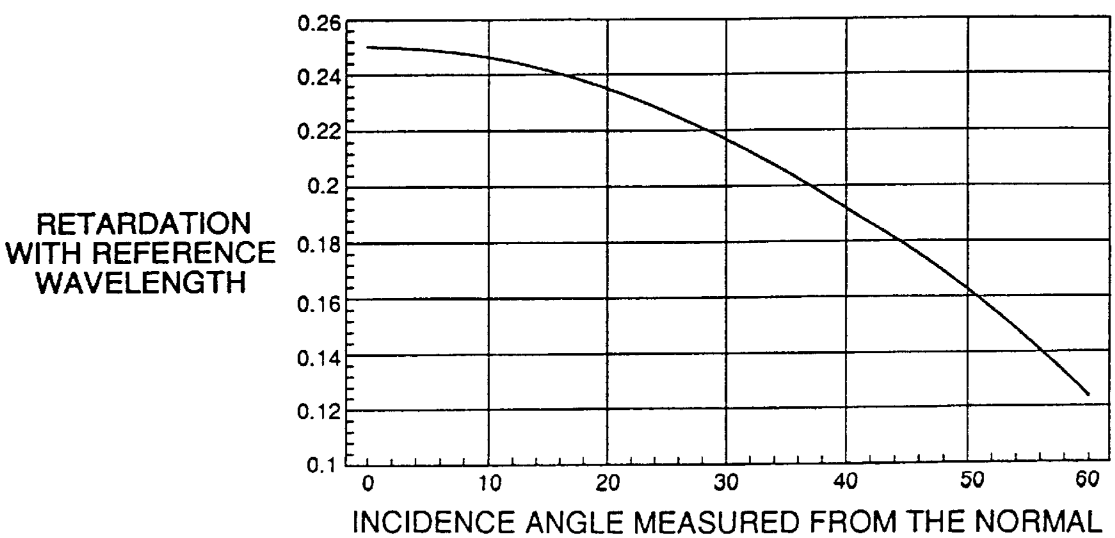
FIG. 13 is a view for explaining a change of retardation of light depending upon an angle of incidence measured from the normal to a quarter-wave plate in an earlier optical device.

The equation 2 is calculated by putting numerical values therein. A graph of FIG. 13 shows a change of retardation with incident angles measured from the normal. As is apparent from the graph, retardation is decreased twice at an incident angle of 60°. Accordingly, an optical system using the quarter-wave plate allows slant rays to pass at a side of the visual field and fall into the user s eye and absorb a part of necessary signal light, resulting in decreasing a S/N ratio of a display image.

Figure 14:
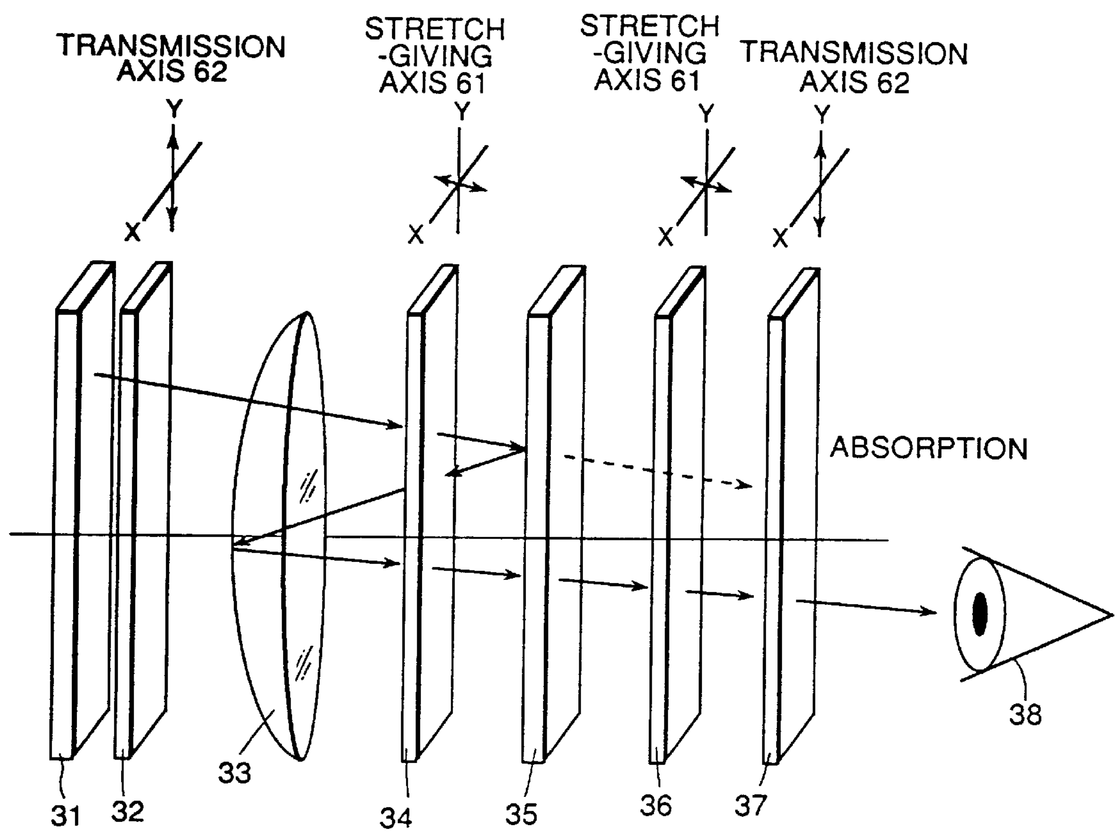
FIG. 14 is a schematic view showing an arrangement of optical elements composing an earlier optical device.

(3) The third reason is a change of retardation characteristics of the first and second quarter-wave plates 34, 36 for wavelengths. If the wavelength of each quarter-wave plate does not match with the designed value, its retardation deviates from ¼ of the wavelength and the plate can not shut off and transmit light rays as designed. Consequently, a part of light from the LCD 31, similarly to the first and second cases, directly reaches the user's eye as noise light to be further described below in detail:

As shown in FIG. 14, the earlier optical device disposes the first and second quarter-wave plates 34, 36 so that their stretch-giving axes 61 match with each other and incline at 45° to a transmission axis 62 of the first polarizer plate 32. In this unit construction, the first quarter-wave plate 34 and the second quarter-wave plate 36 can cooperatively act as a half-wave plate. Consequently, the light from the first polarizer plate 32 passes the first and second quarter-wave plates 34, 36, and emerges therefrom as polarized in direction normal to the transmission axis 62 of the first quarter-wave plate 32.

To absorb this light that may reach the user's eye 38 directly from the LCD 31, the second polarizer plate 37 is disposed so that its transmission axis 62 is coincident with the transmission axis 62 of the first polarizer plate. The desired purpose can be realized if the quarter-wave plates have an ideal quarter-wave retardation for any wavelength.

Figure 15:
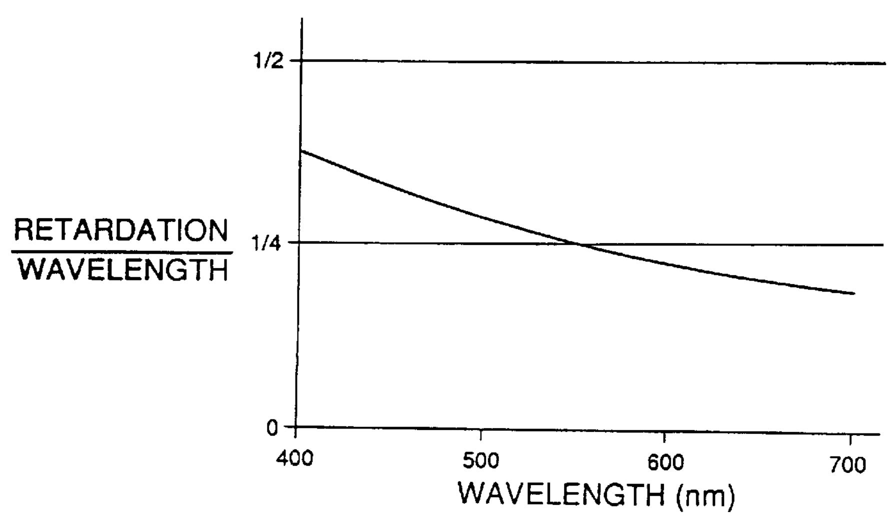
FIG. 15 is a view showing a wave-length characteristic of a polycarbonate used a quarter-wave plate.

However, practical quarter-wave plates vary retardation with wavelengths. By way of example, wavelength characteristics of polycarbonate usually used as a quarter-wave plate is indicated in FIG. 15. The graph of FIG. 15 indicates a wavelength of transmitted light on the abscissas and retardation of the light (in percentage to wavelength) on the ordinate.

Figure 16:
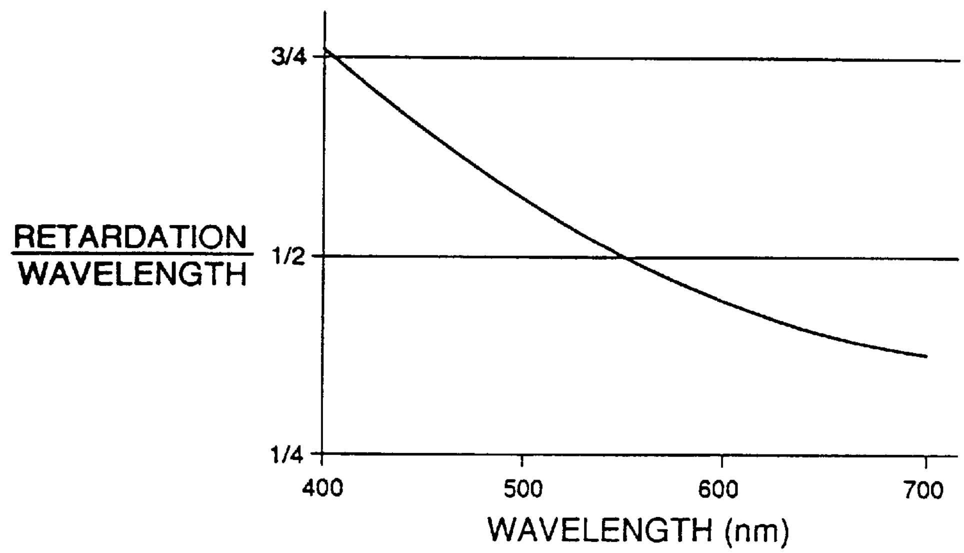
FIG. 16 depicts a change of retardation of two quarter-wave plates according to respective wave-lengths.

The first and second quarter-wave plates having the characteristics are disposed with their stretch-giving axes 61 being in line as shown in FIG. 14. In this case, as shown in FIG. 16, total retardation characteristic of the first and second quarter-wave plates 34, 36 may remain a change of retardation depending upon wavelengths. In particular, blue light having a short wavelength suffers retardation by ¾ of the wavelength.

Accordingly, the second polarizer plate 37 disposed after the second quarter-wave plate 36 can not absorb all rays of light, allowing blue noise light to reach the user's eye 38. As the combined retardation of two quarter-wave plates 34, 36 varies with wavelengths of light rays, light rays pass the second polarizer plate 37 and reach the user's eye as noise light.

Figure 17:
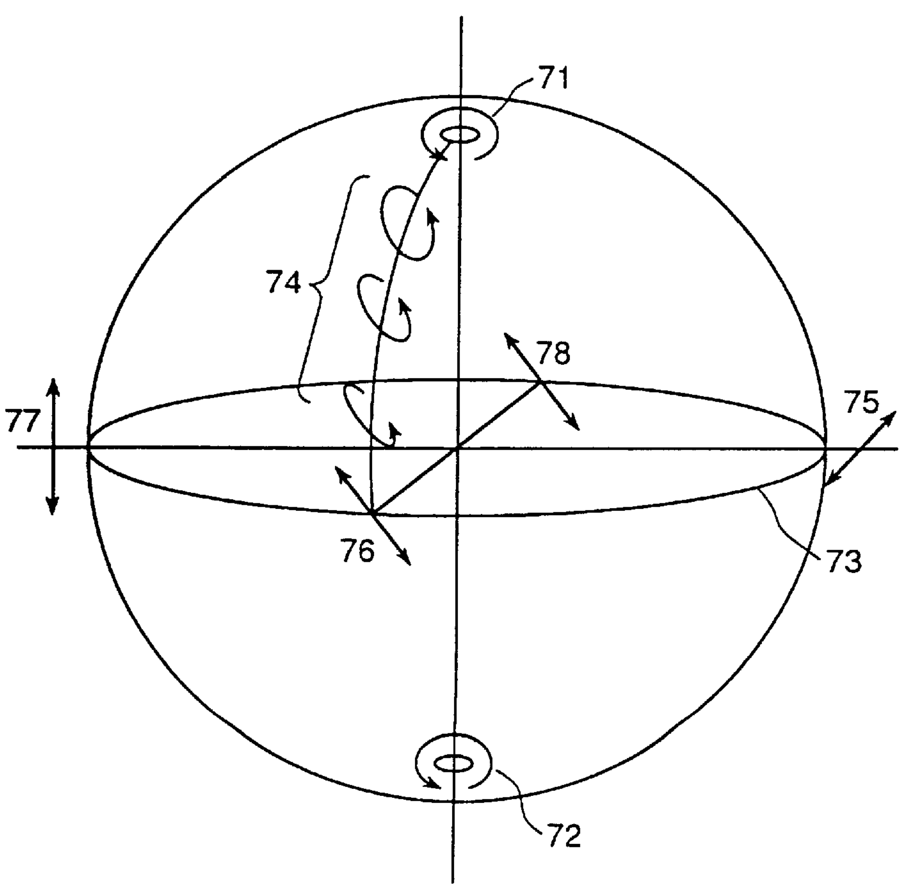
FIG. 17 depicts a Poincare's sphere.

A function of a simple quarter-wave plate is described below in detail by using a Poincare's sphere. The Poincare's sphere is a system indicating polarization of light by points on a sphere. FIG. 17 shows an external view of the Poincare's sphere. If this sphere is regarded as the earth, points 71 and 72 corresponding to the north pole 71 and the south pole 72 indicate counterclockwise circularly polarized light and a clockwise circularly polarized light respectively. A point 73 on the equator relates to plane-polarized light and a longitude on the equator corresponds to twice an angle of the plane-polarized light.

Accordingly, if a longitude in a -Z-axis direction is defined 0, a point 77 on the equator in a Z-axis direction represents a vertical straight line and -X-axis direction 78 represents plane-polarized light in a 45-degree direction. Similarly, a x-axis direction 75 indicates a plane-polarized light in a horizontal direction and a x-axis direction 76 indicates plane-polarized light in a −45-degree direction. A space 74 between the equator and the north pole represent an elliptically polarized light. Thus, any polarized light can be expressed by a point on the Poincare's sphere.

The function of a retardation plate is expressed as an effect of rotating the Poincare's sphere by a retardation value measured in terms of angles. In this case, a rotation axis is defined as a straight line jointing a center of the Poincare's sphere with a point on the equator, which corresponds to a doubled longitude degree in the optical axis direction of the retardation plate.

Figure 18A:
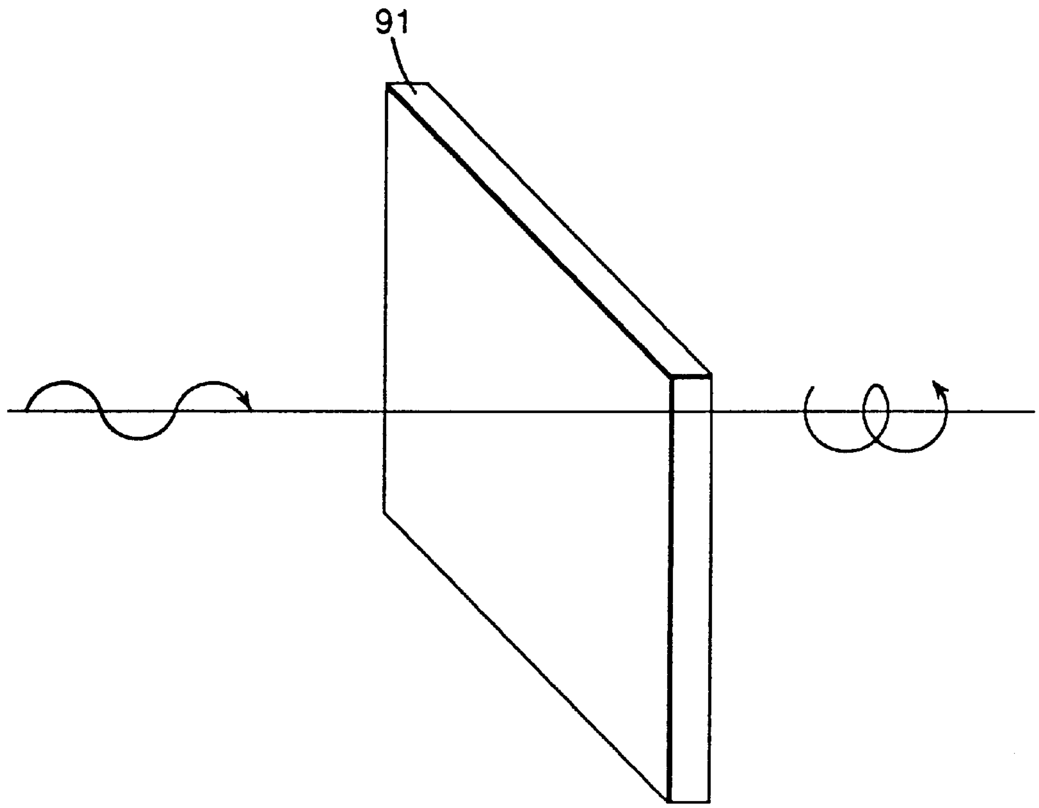
FIGS. 18A and 18B schematically depicts an ellipsoid of refractive indexes for a quarter-wave plate in an earlier optical device.
Figure 18B:
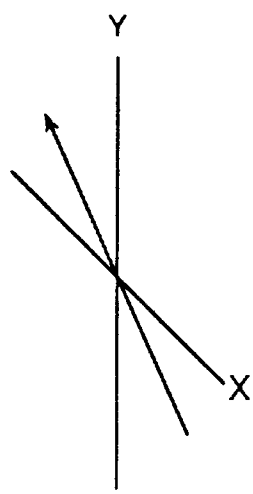

A simple quarter-wave plate used in the conventional optical unit is now examined. As shown in FIG. 18, a standard polycarbonate-made quarter-wave plate 91 is disposed with its stretch-giving axis disposed in a −45-degree direction in order to obtain counterclockwise circularly polarized light when a plane-polarized visible light (400 nm–700 nm) falls on the plate at an angle of 90° thereto.

The above-mentioned object can be realized if the retardation amount of the quarter-wave plate is always a quarter-wavelength to the incident light wavelength. However, an actually measured retardation of polycarbonate-made quarter-wave plates (FIG. 15) shows a quarter-wave retardation at the designed wave-length (500 nm) but an excess retardation with shorter wavelengths and an insufficient retardation with longer wavelengths.

Figure 19:
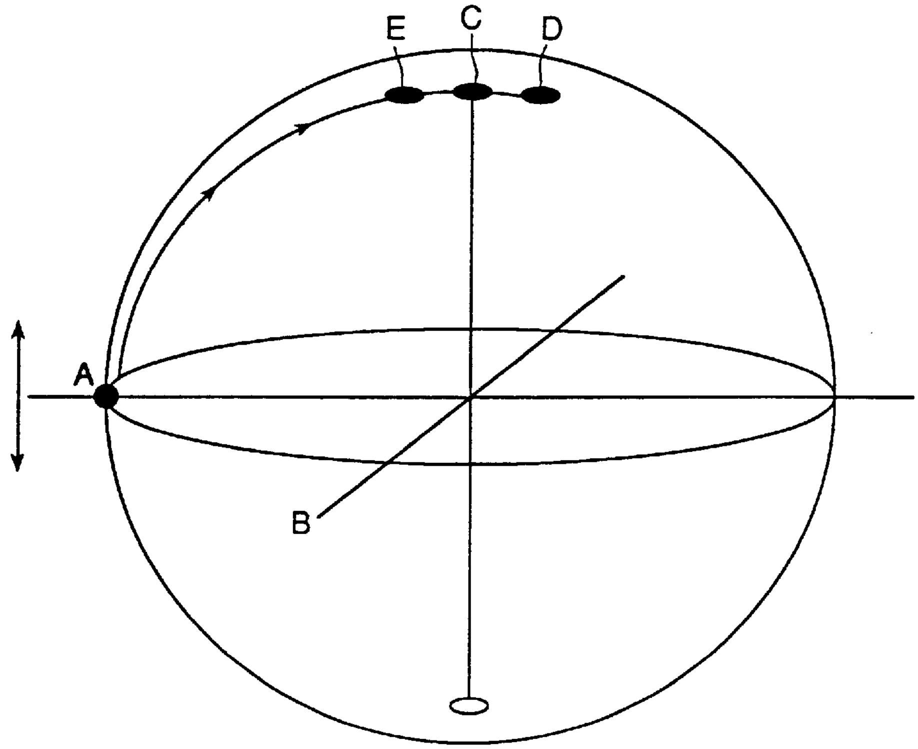
FIG. 19 depicts a Poincare's sphere showing a characteristic of a quarter-wave plate used in an earlier optical device.

The same facts can be explained by using a Poincare's sphere as shown in FIG. 19. A plane-polarized incident light that is polarized in a vertical direction is expressed by a point A on the equator. An optical axis of a quarter-wave plate is expressed by a straight line and its activity is expressed by rotating the Poincare's sphere about the straight line B (optical axis) according to the retardation amount (90 degrees for the quarter-wave plate).

Accordingly, the point A is transferred to the north pole point C for light of the designed wavelength to form a complete circularly-polarized light, but the point A is transferred to a point D for light of shorter wavelength because of an excess retardation amount or to a point E for light of longer wavelength because of an insufficient retardation amount. Thus, light whose wavelength is other than the designed wavelength is converted to (not-circularly) elliptically polarized light.

Figure 20:
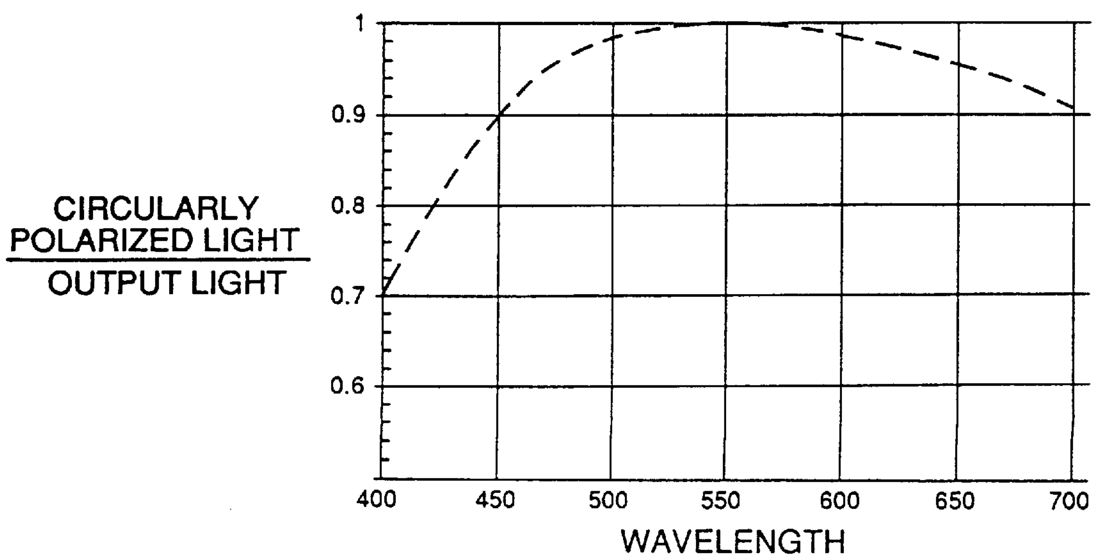
FIG. 20 is a view for explaining a wave dispersion characteristic of a wide-band-wave plate in an earlier optical device.
Figure 21:
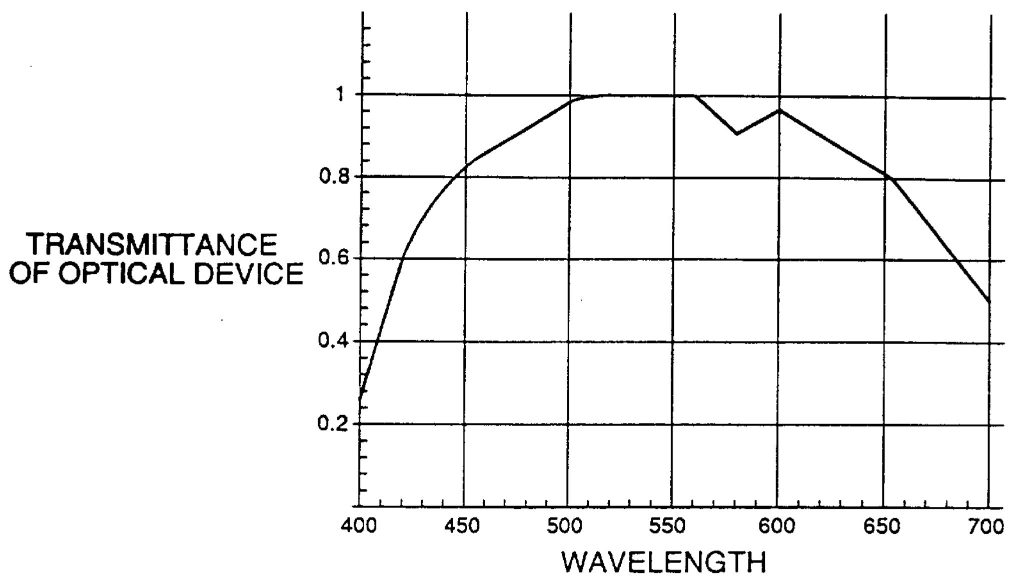
FIG. 21 is a view for explaining a spectrum transmittance characteristic of a wide-band-wave plate in an optical device which is the fourth embodiment of the present invention.

FIG. 20 is a graph showing a ratio of circularly-polarized rays in output light of this simple quarter-wave plate. The graph shows that the simple quarter-wave plate has different ratios of circularly-polarized rays in output light, which amount varies with different wavelengths. The earlier optical device using the simple quarter-wave plates has such a spectral transmittance characteristic of signal light as shown in a graph of FIG. 21, where a large dispersion of visible light transmittance is observed with a particularly low transmittance of blue light and red light.

Consequently, the earlier optical device using the simple quarter-wave plates produces noise rays because the quarter-wave plates may produce elliptically polarized light.

Figure 22:
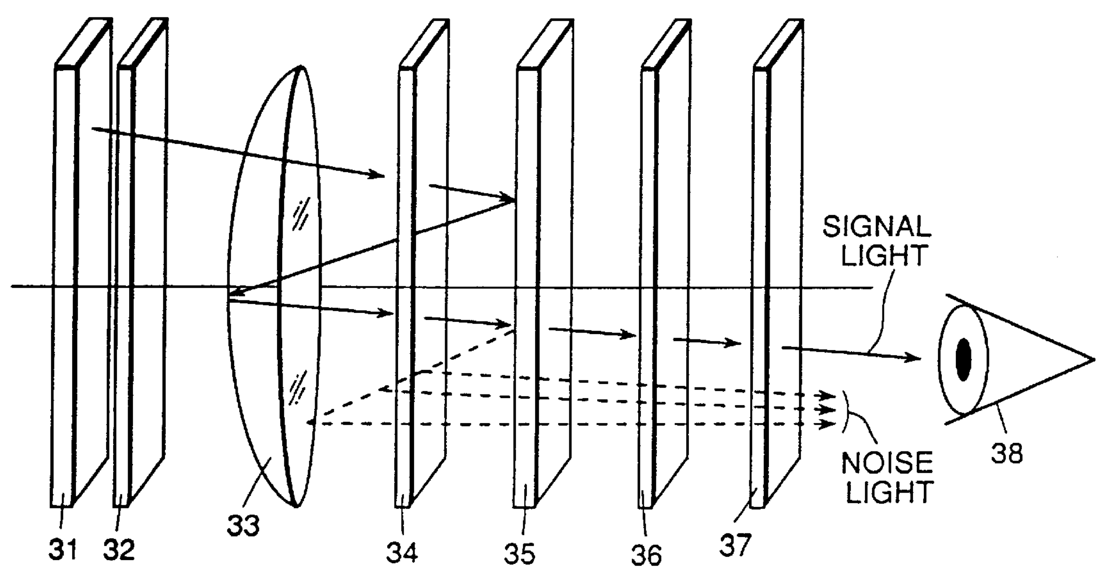
FIG. 22 depicts an earlier optical device.

(4) The fourth reason is that unnecessary reflection of light occurs between the plano-convex lens 33 and the half-mirror 35, as shown in FIG. 22. This unnecessary reflection of light may take place at both surfaces of the first quarter-wave plate 34 and at the user's side surface of the plano-convex lens 33. Noise light produced from the unnecessary reflection is polarized in the same way as the signal light, passes the second polarizer plate 37 and reaches the user's eye 38. Light may be usually reflected by 5% from the surfaces, of the plano-convex lens and the first quarter-wave plate. In this case, reflected noise rays amounts 15% of the light.

(5) The fifth reason is the light reflection from the LCD 31. A half (50%) of light from the LCD 31 is reflected by the plano-convex lens 33 and returns to the LCD 31. If the reflected light is further reflected by the LCD 31, it may reach the user's eye 38 as a noise component of signal light. Usually, the LCD with a black matrix without anti-reflection coating may reflect 25% of the reflected light, producing unnecessary reflected light, i.e., noise light that amounts 12.5% (50%×25%) in relation to signal light.

(6) The sixth reason is such that light is reflected from rear surfaces of the second quarter-wave plate 36, the second polarizer plate 37 and the half-mirror 35. Signal light having passed through the half-mirror 35 may be doubly reflected and become a noise light that produces a ghost image. Furthermore, external reflected light may fall on the user's eye 38, resulting in decreasing the contrast of a formed image.

Preferred embodiments of the present invention will be described below with reference to FIGS. 25 to 40 wherein components similar to those described for the conventional art device are designated by the same numerals and will not be further described.

(First Embodiment)

Figure 25:
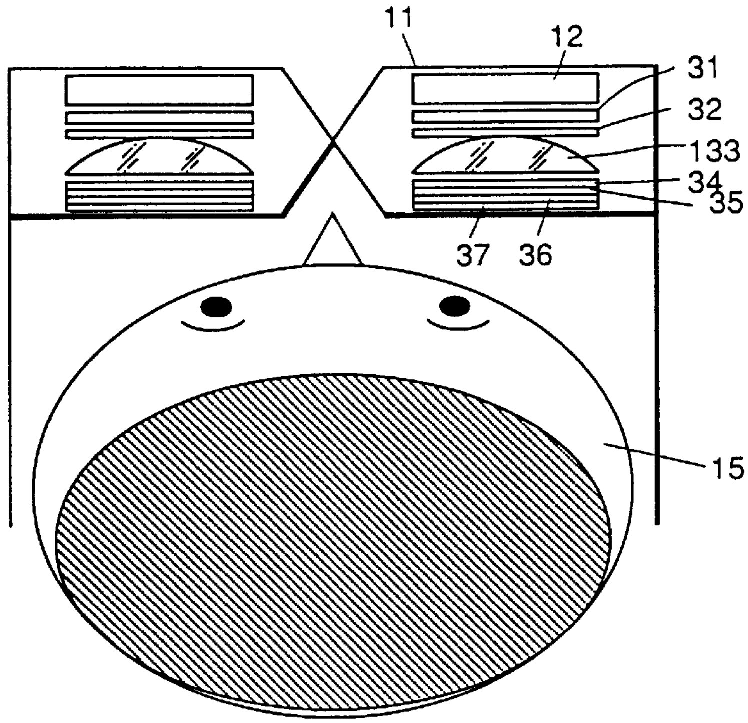
FIG. 25 is a schematic construction plan view of a head-mounted display (HMD) using an optical device which is a first embodiment of the present invention.

The first embodiment of the present invention is explained referring to FIG. 25 showing a plan view of a head-mounted display (HMD) using an optical system that is the first embodiment of the present invention.

FIG. 25 is illustrative of an image display device according to the present invention, which is applied to a HMD used for displaying an image of virtual reality.

As shown in FIG. 25, the HMD using the optical device according to this embodiment comprises a spectacle-like case 11 which accommodates two display units disposed by one at left and right therein: each display unit is composed of a back light 12, a liquid-crystal display (LCD) 31, a first polarizer plate 32, a plano-convex lens having a half-mirror coat applied onto its convex surface (reflecting-refracting means) 133, a first quarter-wave plate 34, a half-mirrors 35, a second quarter-wave plate 36 and a second polarizer plate 37, which are aligned in said order from the out side (opposite to the side facing a user 15) of the case.

The user 15 mounts the HMD on his or her own head so that his or her eyes position in front of respective display units in the case 11. Video on the LCD 31 is enlarged and presented to the user who can enjoy the enhanced impression of the video image, feeling the presence therein.

In this embodiment, there is used the plano-convex lens 133 made of copolymerized macromolecular material having both positive and negative photoelastic coefficients relative to an inner stress. Such material is, e.g., non-birefringent resin material for optics, which is disclosed by the name Optolets by Hitachi Kasei Kogyo CO., LTD.

In the optical device according to the first embodiment, noise light is distinguished from signal light by its polarized state as described before in the device. Accordingly, the system using a lens having so large photoelastic coefficients to disturb the polarized state of light may impair the quality of a display image because the polarizer plate allows a part of noise light to pass and shuts off a part of signal light.

In this regard, glass has a small photoelastic coefficient and is suitable to use but it may be not sufficiently light. In particular, a HMD with a weighty lens system may have its gravity center shifted downward, applying a load onto a nose of the user. The user may feel further unpleasant force whenever he or she rotates own head with the HMD. Acrylic resin is lighter but has a large photoelastic coefficient. Acrylic resin-made lenses produced by injection molding may obtain an undesired birefringent property.

The use of a plano-convex lens 133, which is made of copolymerized macromolecular non-birefringent material having positive and negative photoelastic coefficients to an internal stress, makes it possible to manufacture a lighter HMD which can also provide an image with an improved S/N-ratio because light may not be disturbed in its polarized state while passing the plano-convex lens 133.

(Second Embodiment)

Figure 26:
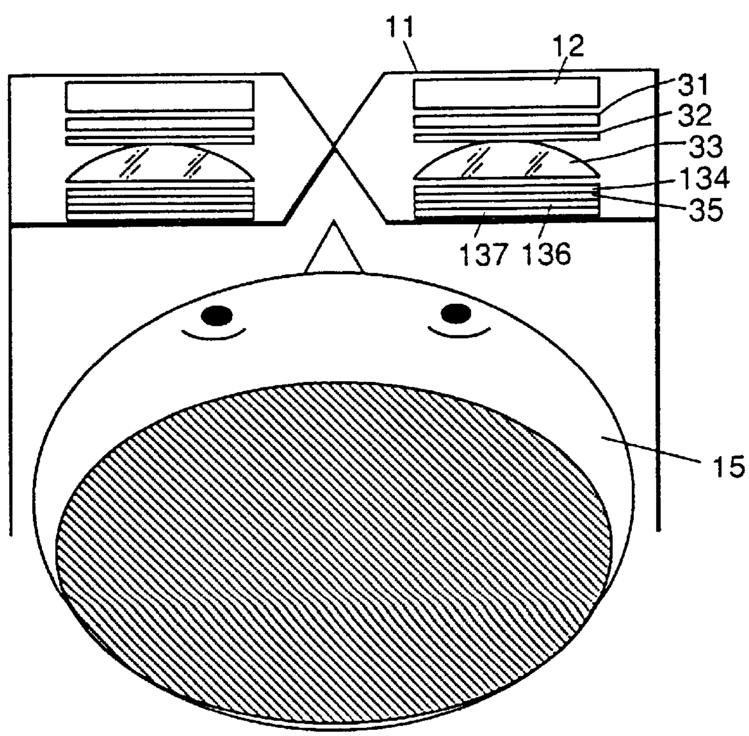
FIG. 26 is a schematic construction plan view of a HMD device using an optical device which is a second embodiment of the present invention.
Figure 27:
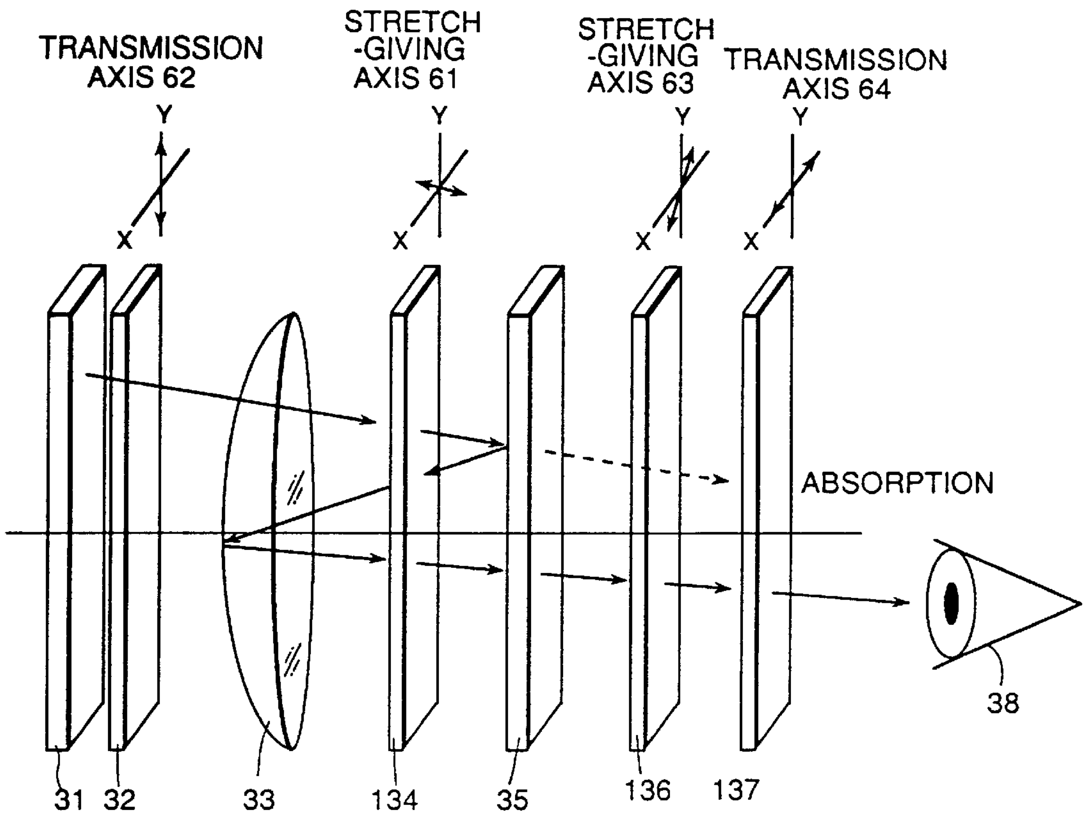
FIG. 27 is a schematic view showing an arrangement of optical elements composing an optical device which is the second embodiment of the present invention.
Figure 28:
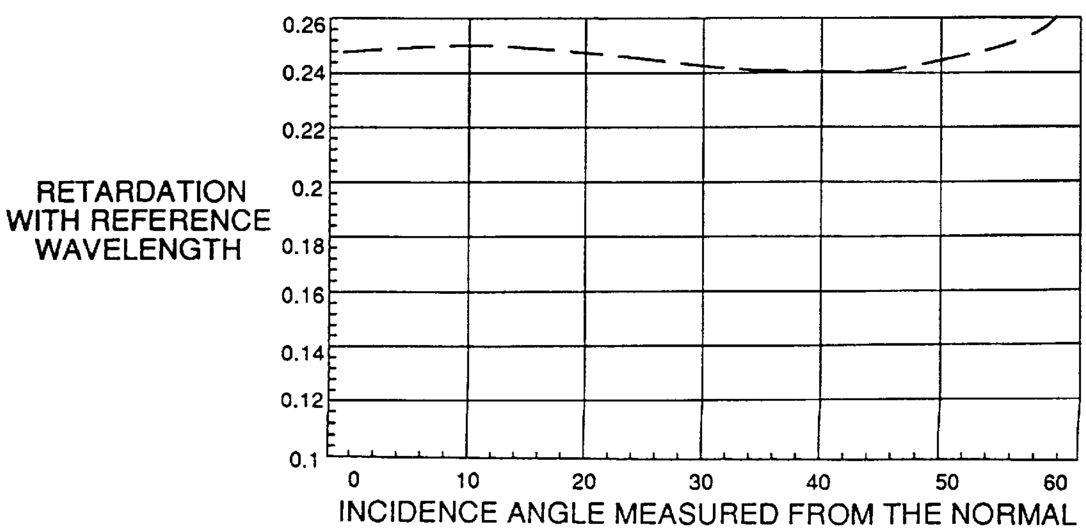
FIG. 28 is a view for explaining a change of retardation of light depending upon an angle of incidence measured from the normal to a quarter-wave plate in the second embodiment of the present invention.
Figure 29:
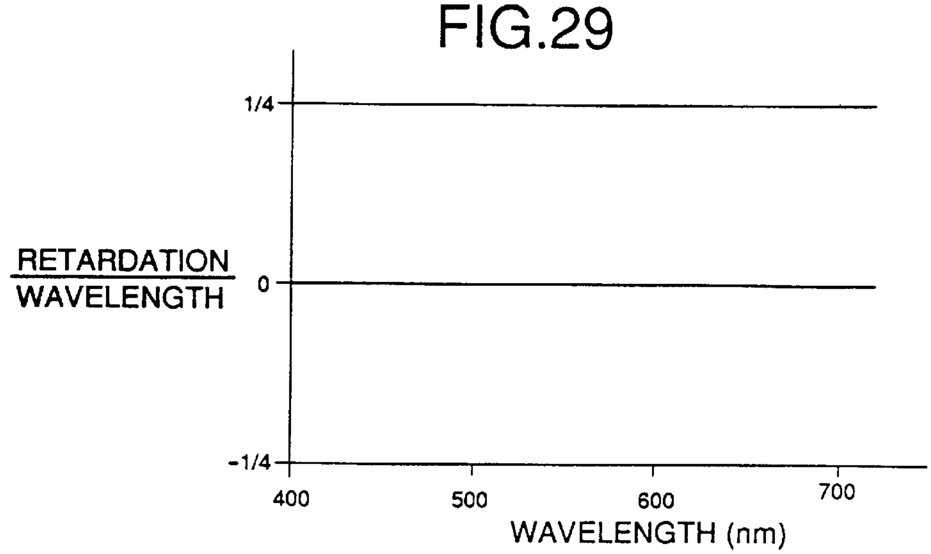
FIG. 29 is a view for explaining a change of retardation of two quarter-wave plates according to respective wave-lengths in the second embodiment of the present invention.

Referring to FIGS. 26 to 29, the second embodiment of the present invention is described as follows: FIG. 26 is a plan view for schematically illustrating a construction of HMD using an optical device according to the second embodiment, FIG. 27 is illustrative of arrangement of optical elements composing an optical unit of the optical device according to the second embodiment, FIG. 28 is a graph indicating a change of retardation of light in a quarter-wave plate depending upon incident angles measured from a line normal to said quarter-wave plate of the optical unit according to the second embodiment and FIG. 29 is a graph indicating a wavelength-dependent retardation characteristic of a quarter-wave plate of the optical unit according to the second embodiment.

In the HMD using the optical device according to the second embodiment of the present invention: As shown in FIGS. 26 and 27, the shown embodiment of the optical device of the HMD includes two (first and second) quarter-wave plates 134 and 136 with a refractive index in the thickness direction, which value lies between the maximal and minimal refractive values obtained within the wave-plate surface. These quarter-wave plates are disposed so that their stretch-giving axes may intersect with each other at right angles.

As described before, the first and second quarter-wave plates 34 and 36 of the earlier optical device has characteristics of $n_x>n_z=n_y$. In this embodiment, the first and second quarter-wave plates 134 and 136 have a refractive index $n_z$ in the thickness direction, which value lies between refractive indeces $n_x$ and $n_y$ on the plate surface.

The graph of FIG. 28 shows the results of calculation of Equation 2 with $n_z$=1.5908 for example. In contrast to the graph of FIG. 13 for the earlier device, this graph of FIG. 28 proves that the quarter-wave plate having refractive index in the thickness direction can considerably reduce a change of retardation. Accordingly, the application of these quarter-wave plates 134 and 136 can realize an optical system with an improved S/N-ratio.

In this embodiment, the first and second quarter-wave plates 134 and 136 are disposed with their stretch-giving axes intersecting with each other at right angles. Namely, the stretch-giving axes 61 and 63 of the first and second quarter-wave plates 134 and 136 are tilted at +45 degrees and −45 degrees respectively to the transmission axis 62 of a first polarizer plate 32 as shown in FIG. 27.

The first and second quarter-wave plates 134 and 136 thus arranged can cooperatively cancel the retardation of light passing therethrough. Therefore, light from the first polarizer plate 32 passes the first and second quarter-wave plates 134 and 136 and emerges therefrom as polarized in a direction corresponding to the transmission axis direction of the first polarizer plate 32. Thus the second polarizer plate 137 disposed with its transmission axis 64 intersecting at right angles with the transmission axis 62 of the first polarizer plate 32 can absorb light rays that may be directly transmitted from the LCD to the user's eye as noise light.

Signal light enlarged by the plano-convex lens 33 is emitted through the second quarter-wave plate 136 as light polarized in a plane normal to the noise light. The signal light then passes the second polarizer plate 137 and reaches the user's eye 38.

If the quarter-wave plates have an ideal retardation characteristic, i.e., the same quarter-wave retardation with all wavelengths, the earlier optical device of FIG. 14 and the present embodiment of FIG. 27 may perform the same function. However, actual quarter-wave plate varies the retardation with wavelength and, therefore, the earlier optical device produces noise light.

On the contrary, the optical system according to the present embodiment has the first and second quarter-wave plates 134, 136 with their stretch-giving axes intersecting with each other at right angles, which can, cancel by each other their retardation characteristics, thus making retardation be zero irrespective of wavelength of light as shown on the graph of FIG. 29. Consequently, all rays having directly passed the quarter-wave plates can be absorbed by the second polarizer plate 137 disposed after the second quarter-wave plate 136, preventing the occurrence of noise light.

The optical device according to the present embodiment can produce an image of an improved S/N-ratio by reducing noise rays by disposing the first and second quarter-wave plates 134 and 136 with their extension axes 61 and 63 intersecting with each other at right angles.

(Third Embodiment)

In the first and second embodiments, each optical unit of their optical device includes a LCD 31, a first polarizer plate 32, a plano-convex lens (reflecting-refracting means) 133, a first quarter-wave plate 134, a half-mirror 35, a second quarter-wave plate 136 and a second polarizer plate 137, which are disposed in said order from the incident side. However, an optical device according to the present invention is not limited to the above-mentioned arrangement of components.

Figure 30:
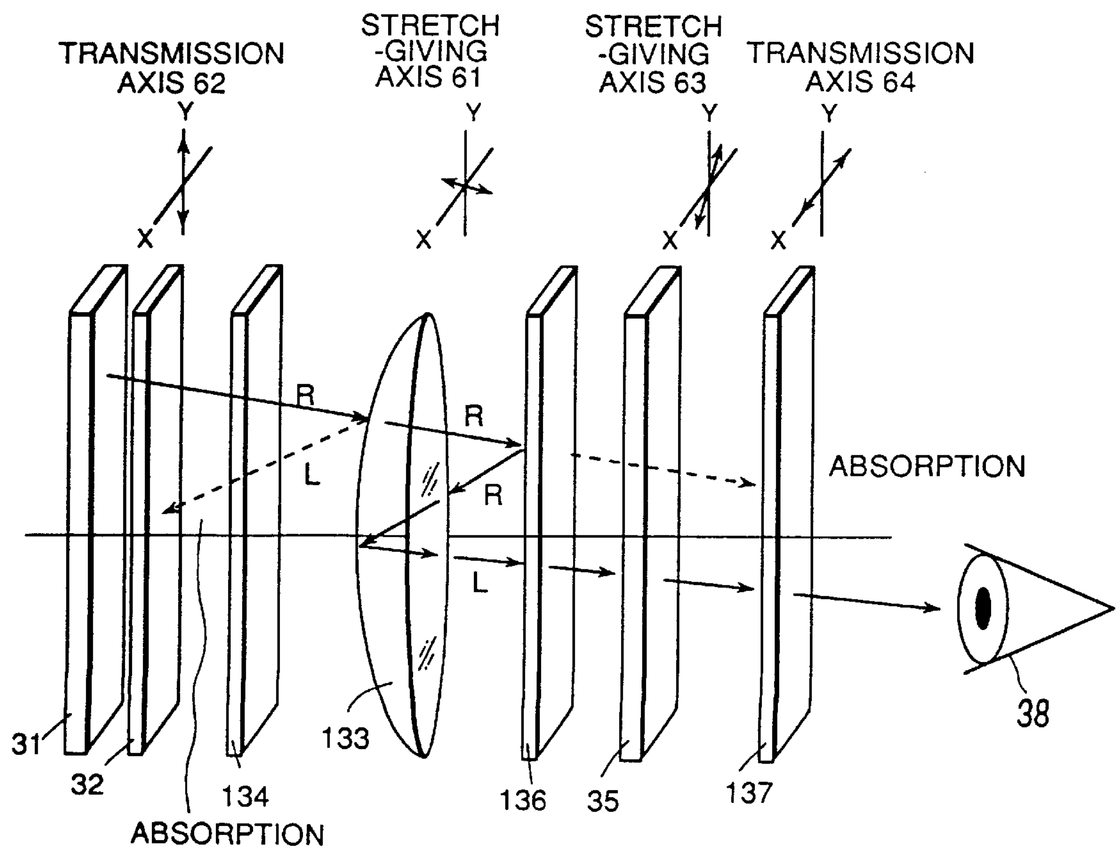
FIG. 30 is a schematic view showing an arrangement of optical elements composing an optical device which is a third embodiment of the present invention.

Referring to FIG. 30, an optical system wherein optical elements composing each optical unit are arranged in another different order will be described below by way of example as a third embodiment of the present invention. FIG. 30 is illustrative of an arrangement of optical elements composing an optical unit of the optical device used in the third embodiment of the present invention.

In this embodiment, as shown in FIG. 30, an optical unit comprises a LCD 31, a first polarizer plate 32, a first quarter-wave plate 134, a half-mirror-coated plano-convex lens (reflecting and refracting means) 133, a second quarter-wave plate 136, a half-mirror 35 and a second polarizer plate, which are disposed in said order from the incident side.

Similarly to the first and second embodiments, this embodiment disposes the transmission axis 62 of the first polarizer plate 32 at 0 degree, the stretch-giving axis 61 of the first quarter-wave plate 134 at 45 degrees, the stretch-giving axis of the second quarter-wave plate 136 at −45 degrees and the transmission axis 64 of the second polarizer plate 137 at +90 degrees.

In the optical device, light from the LCD 31 passes the plano-convex lens 133 and the second quarter-wave plate 136 and enters into the half-mirror whereby light is split into two rays: transmitted light and reflected light. Through the second quarter-wave plate 136 whose stretch-giving axis 63 intersects at right angles with the stretch-giving axis 61 of the first quarter-wave plate 134, the transmitted light is plane-polarized in the zero-degree direction and absorbed by the second polarizer plate 137.

The light reflected from the half-mirror 35 is converted again to clockwise circularly polarized light by the second quarter-wave plate 136 and then reflected from half-mirror surface of the plano-convex lens 133. Thereby, it becomes counterclockwise circularly polarized light. This counterclockwise circularly polarized light is then converted by the second quarter-wave plate 136 to plane-polarized light in the direction of +90 degrees, which passes through the second polarizer plate 137 and reaches the user's eye 38.

Figure 23:
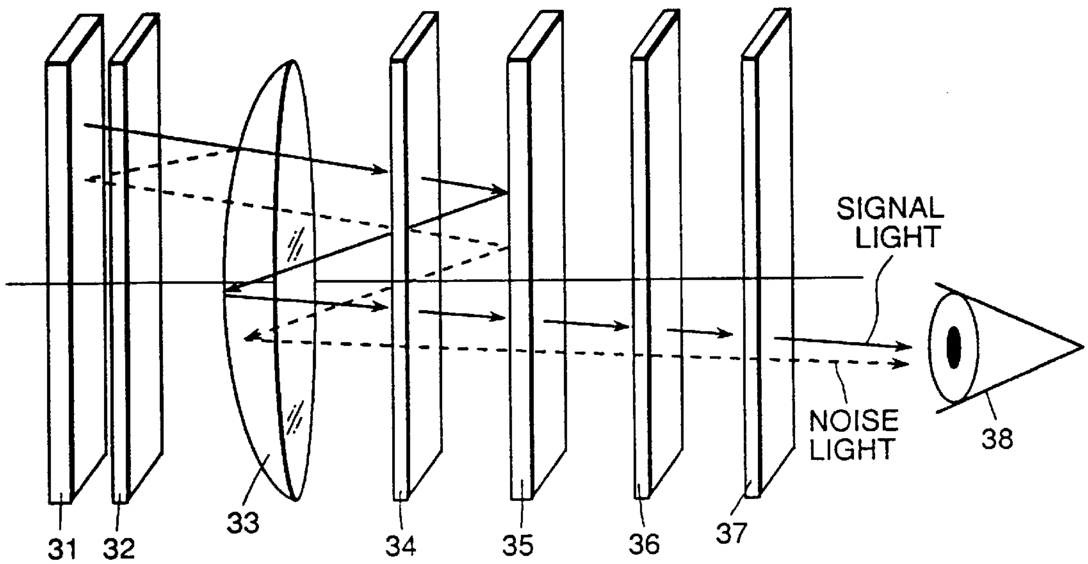
FIG. 23 depicts an earlier optical device.

Similar to the first and second embodiments, the present embodiment can effectively enlarge an image displayed on the LCD 31 by the half-mirror-coated plano-convex lens 133 through the above-mentioned process. The advantageous feature of the present embodiment is as follows:

In contrast to the earlier device (FIG. 23) wherein light reflected from the half-mirror-coated surface of the plano-convex lens 33 reflects at the LCD 31 to produce noise light, the optical device of the present embodiment, as shown in FIG. 30, can convert the reflected light from the half-mirror coated surface of the plano-convex lens 133 to a counterclockwise circularly-polarized light and absorb it by the first polarizer plate 32, thus preventing the occurrence of noise light.

(Fourth Embodiment)

Figure 31:
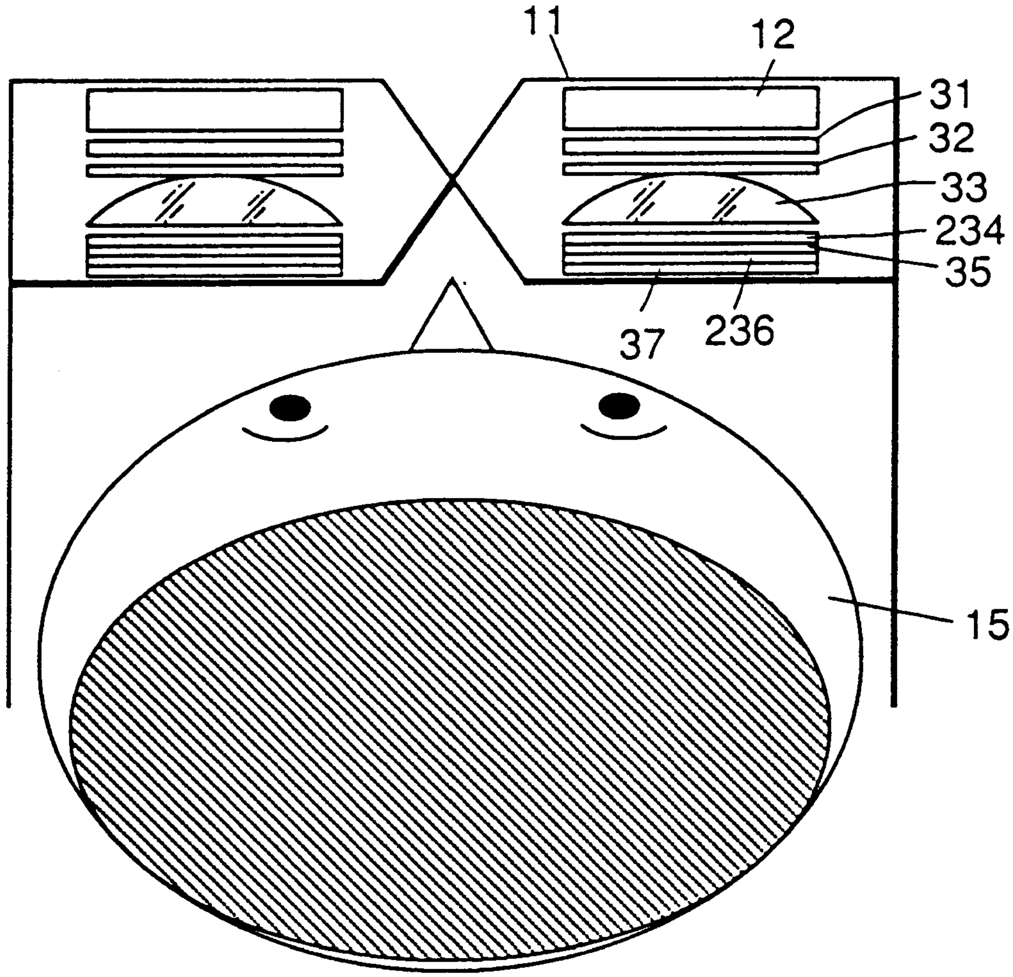
FIG. 31 is a schematic construction plan view of a head-mounted display device using an optical device which is a fourth embodiment of the present invention.
Figure 32A:
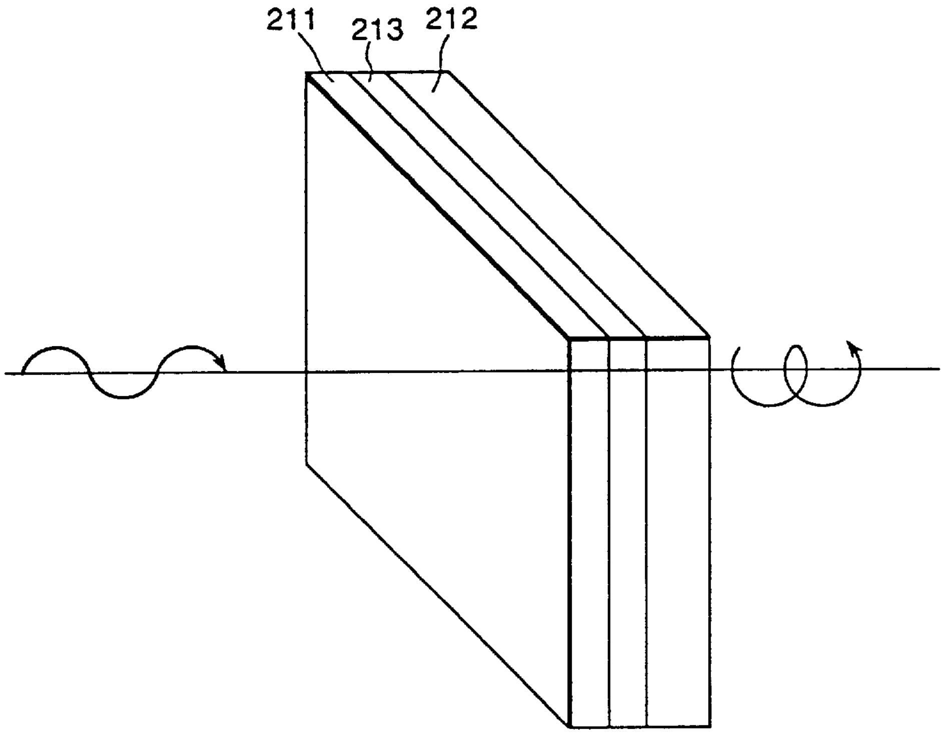
FIGS. 32A, 32B, and 32C are schematic views of a wide-band wave plate used in an optical device which is the fourth embodiment of the present invention.
Figure 32B:
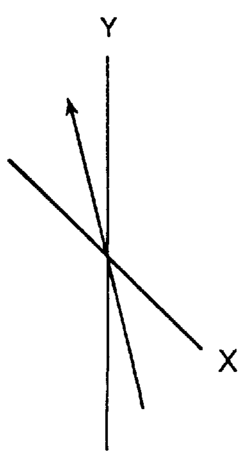
Figure 32C:
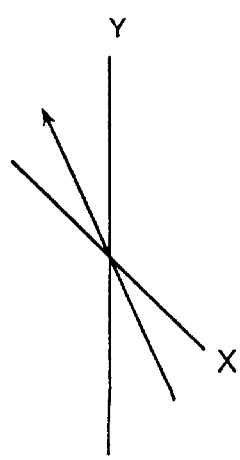
Figure 33:
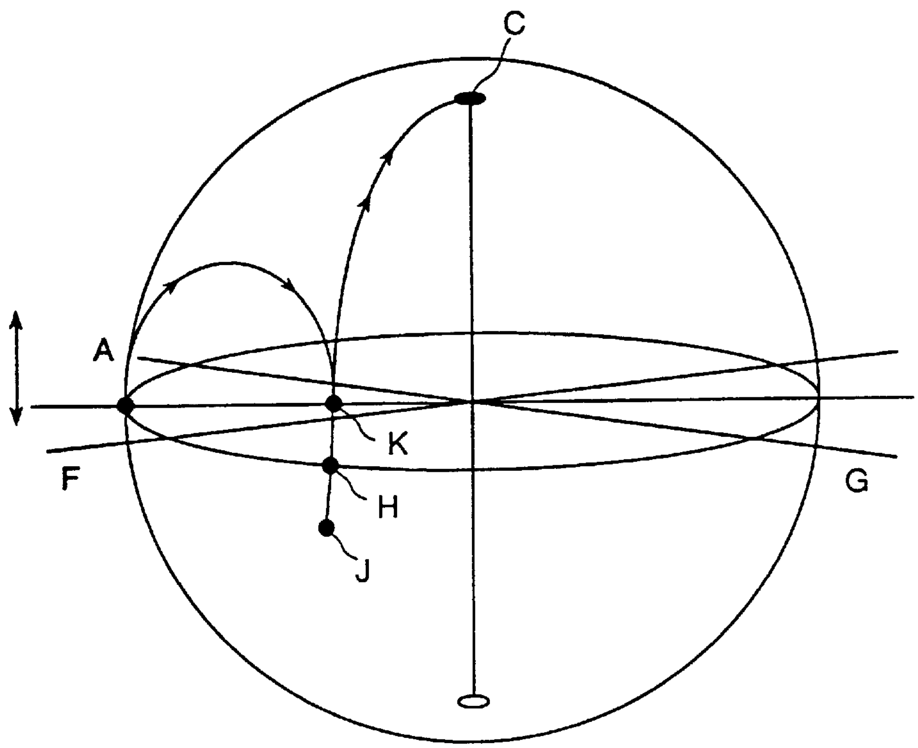
FIG. 33 is a view for explaining a Poincare's sphere showing characteristics of a wideband-wave plate in an optical device which is the fourth embodiment of the present invention.
Figure 34:
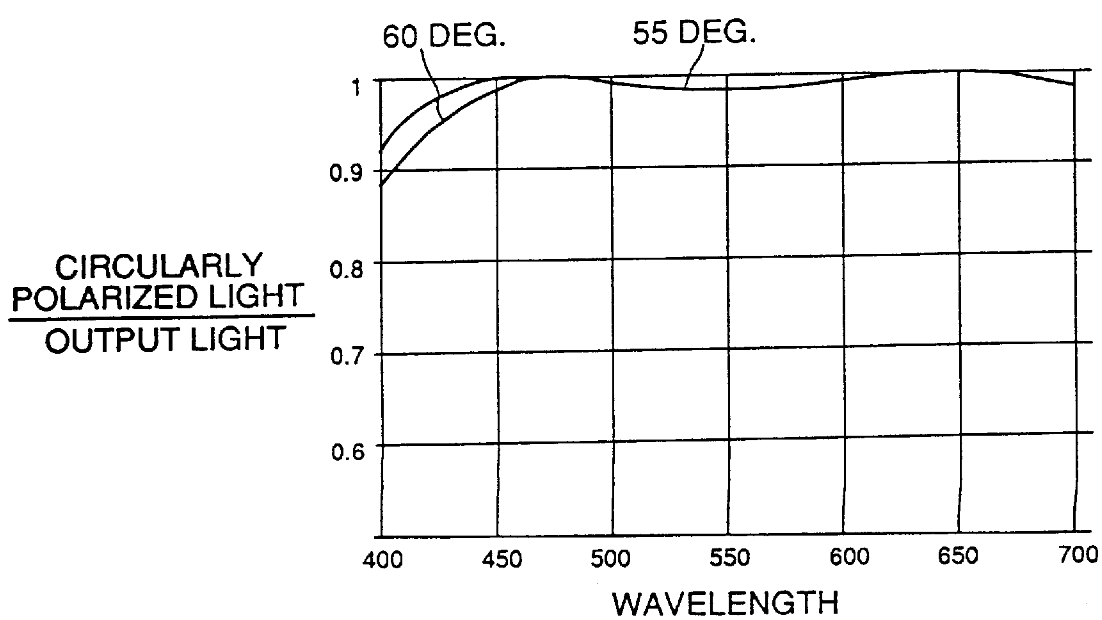
FIG. 34 is a view for explaining a wave dispersion characteristics of a wideband-wave plate in an optical device which is the fourth embodiment of the present invention.
Figure 35:
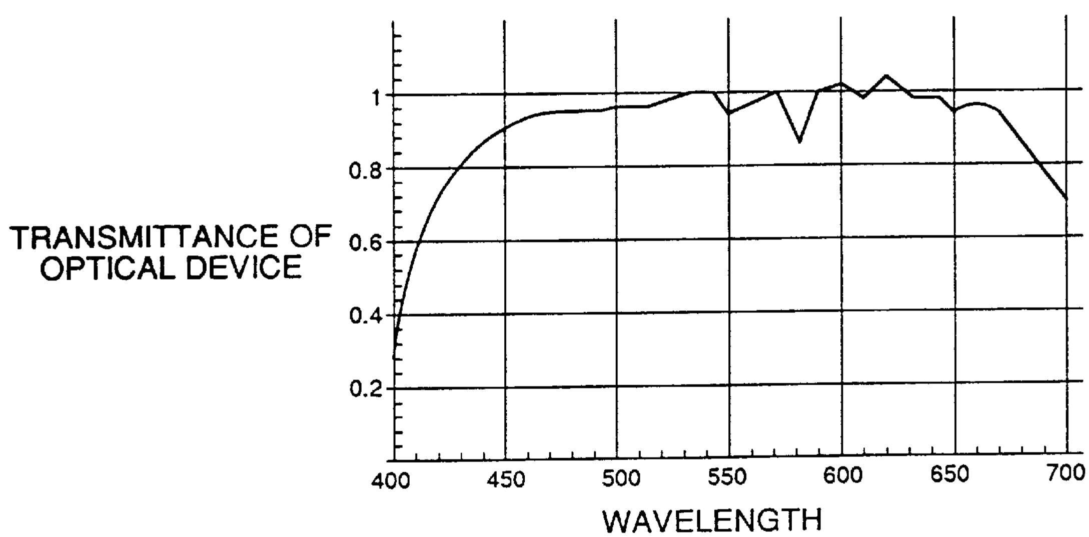
FIG. 35 is a view for explaining a spectrum transmittance characteristic of a wideband-wave plate in an optical device which is the fourth embodiment of the present invention.
Figure 36:
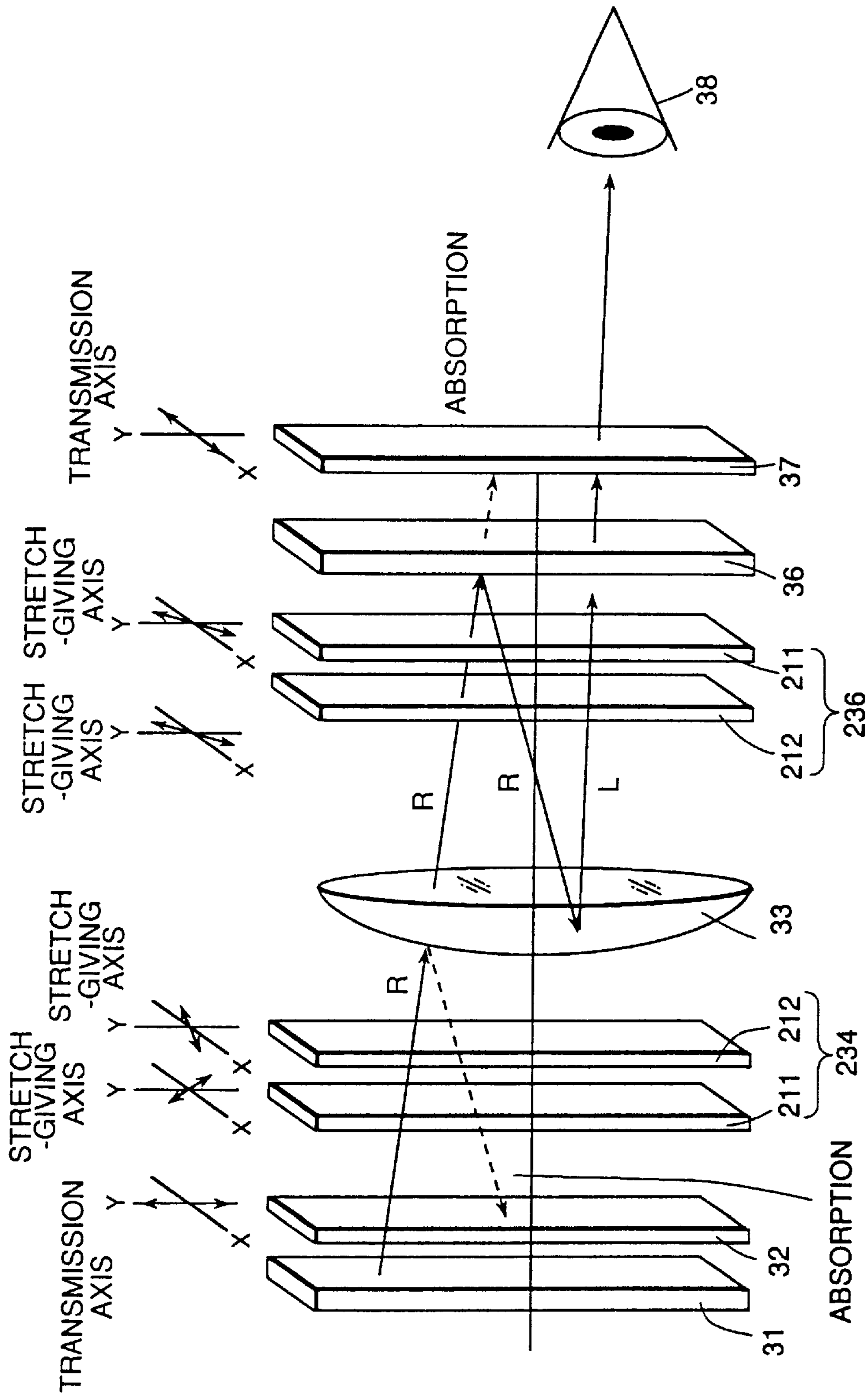
FIG. 36 is a schematic view showing an arrangement of optical elements composing an optical device which is the fourth embodiment of the present invention.

Referring to FIGS. 31 to 36, the fourth embodiment of the present invention is described as follows: FIG. 31 is a plan view for schematically illustrating a HMD using an optical device which is the fourth embodiment of the present embodiment, FIG. 32 is illustrative of a wide-band-wave plate used in an optical device of the present embodiment, FIG. 33 is illustrative of a Poincare's sphere indicating characteristics of the wide-band-wave plate used in the optical device of the present embodiment, FIG. 34 is a graph indicating wavelength dispersion characteristics of the wide-band-wave plate used in the optical device of the present embodiment and FIG. 35 is graph indicating a wavelength-dependent spectral transmittance of the the wide-band-wave plate used in the optical device of the present embodiment. FIG. 36 shows another example of optical elements in an optical device of the present embodiment.

The second embodiment (afore mentioned) of the present invention can considerably reduce an amount of noise light but does not much improve its characteristic of signal light. Namely, the spectral transmittance of the optical unit is desirably constant within the range of visible-light wavelengths to increase color reproducibility of the display. With a simple quarter-wave plate, the retardation of light therein varies with wavelengths. Therefore, light of wavelength other than the designed value is converted into elliptically polarized light, resulting in decreasing the transmittance.

To solve the above-mentioned problem, the optical device of the present embodiment uses, instead of the first and second quarter-wave plates 34 and 36 of earlier simple constructed device, two (first and second) wideband-wave plates 234 and 236 (FIG. 31) each of which is prepared by bonding a quarter-wave plate with a half-wave plate at a specified angle. As shown in FIG. 32, the wideband-wave plates 234 and 236 used in the present invention are composed each of a half-wave plate 211 and a quarter-wave plate 212, which are bonded to each other with bonding material 213. The half-wave plate 211 has its stretch-giving axis disposed in the direction of −15 degrees and the quarter-wave plate has its stretch-giving axis disposed in the direction of −75 degrees. The half-wave plate 211 and the quarter-wave plate 212 can be prepared by stretching (drawing) a high-polymer film. The plates used in the present invention are made of polycarbonate that is well used as a material for retardation plates.

The wideband-wave plates 234 and 236 are designed to act as a quarter-wave plate having an improved wavelength dispersion characteristic when plane-polarized light confined to the normal plane (0°) enters the wideband-wave plate 234 (236) from the half-wave plate side. Accordingly, they can convert the light into substantially circularly-polarized light irrespective of wavelength within the range of visible rays (400 nm–700 nm). The application of these wideband-wave plates in place of the conventional simple quarter-wave plates can therefore realize a considerable improvement of the spectral transmittance characteristic of the optical device.

The optical activity of the wideband-wave plates 234 and 236 used in the present embodiment will be explained below by using the Poincare's sphere shown in FIG. 33. The wideband-wave plates 234 and 236 are composed each of a half-wave plate 211 having its stretch-giving axis of −15 degrees and a quarter-wave plate 212 having its stretch-giving axis of −75 degrees. On the Poincare's sphere, the stretch-giving axis of the half-wave plate 211 is represented by a line F and the stretch-giving axis of the quarter-wave plate 212 is represented by a line G. The half-wave plate 211 rotates the plane of polarized light by 180° while the quarter-wave plate 212 rotates the plane of polarized light by 90°. Incident plane-polarized light confined to the normal plane is represented by a point A on the Poincare's sphere. Incident light whose wavelength corresponds to a reference wavelength is transferred to a point H by the quarter-wave plate 211 and then transferred to a point C (north pole) by the quarter-wave plate 212. The light is completely converted to counterclockwise circularly-polarized light that can also be obtained by simple quarter-wave plate.

With incident light of a wavelength shorter than the reference wavelength, the half-wave plate 211 excessively retards and shifts the light to a point J (with a deviation from the point H) but the quarter-wave plate 212 compensates the deviation by its excessive retardation and brings the light close to the point C. With incident light of a wavelength longer than the reference wavelength, the half-wave plate 211 insufficiently retards and transfers the light to a point K (with a deviation from the point H) but the quarter-wave plate 212 compensates the deviation by its insufficient retardation and brings the light close to the point C. Thus, the incident light of any wavelength can be converted to substantially counterclockwise circularly-polarized light.

The characteristics of the wideband-wave plates 234 and 236 was analyzed by ratios of circularly-polarized rays contained in output light. The analysis results are plotted on the graph of FIG. 34. In comparison with the graph of FIG. 20 for conventional simple quarter-wave plates, the graph of FIG. 34 clearly indicates that the wideband-wave plates 234 and 236 have an improved uniform wavelength-dispersion characteristic.

The wideband-wave plates 234 and 236 can be further improved in their wavelength-dispersion characteristics by changing an angle between stretch-giving axes of its components, i.e., the half-wave plate 211 and the quarter-wave plate 212. The graph of FIG. 34 also indicates the characteristic of a wideband-wave plate wherein the half-wave plate 211 and the quarter-wave plate 212 are disposed at an angle of 55° between their stretch-giving axes. The wideband-wave plate (55°) is excellent in uniformity of the characteristic within the range of visible light wavelengths (200 nm–700 nm) as compared with that of the wideband-wave plate (60° as described (b) in FIG. 32).

Not limited to the above-mentioned example, the wideband-wave plate can be adapted to required specifications (e.g., necessary wavelength band) by adjusting an angle formed between stretch-giving axes of the half-wave plate and the quarter-wave plate.

FIG. 35 is a graph showing a spectral transmittance characteristic of signal light obtained of the optical device using the above-mentioned wideband-wave plates 234 and 236. In comparison with the optical device using conventional quarter-wave plates (FIG. 21), the optical unit using the wideband-wave plates 234 and 236 has an improved transmittance of blue light and red light and attains further uniform spectral transmittance within the range of visible light wavelengths.

With half-wave plate 211 and the quarter-wave plate 212, which satisfy the condition $n_x$22 $n_z>n_y$ ($n_x$, $n_y$ denote refractive indexes in the direction of orthogonal axes in a plane of the plates and $n_z$ denotes a refractive index in the direction of thickness of the plates), the embodiment can obtain an improved characteristic for signal light slantingly passing through the optical device as described for the first embodiments. This feature further increases the effectiveness of the shown embodiment.

Although the above-described embodiment uses an optical device wherein a LCD 31, a first polarizer plate 32, a plano-convex lens 33, a first wideband-wave plate 234, a half-mirror 35, a second wideband-wave plate 236 and a second polarizer plate 37 are arranged in the described order from the incident side, the optical device according to the present invention is not limited to the above-mentioned arrangement of its optical components.

Referring to FIG. 36, an example of an optical device composed of differently arranged optical elements is described as follows:

The optical device shown in FIG. 36 comprises a LCD 31, a first polarizer plate 32, a first wideband-wave plate 234 consisting of a first half-wave plate 211 and a first quarter-wave plate 212, a plano-convex lens 33, a second wideband-wave plate 236 consisting of a second half-wave plate 211 and a second quarter-wave plate 212, a half-mirror 35, and a second polarizer plate 37, which are arranged in the described order from the incident side of the system. The stretch-giving axes of the first half-wave plate 211 and the first quarter-wave plate 212 are directed to +15° and +75° respectively while the stretch-giving axes of the second half-wave plate 211 and the second quarter-wave plate 212 are directed to −15° and −75° respectively. The half-wave plate 211 and the quarter-wave plate 212 are bonded to each other at a specified angle that differs from the angle shown for the wideband-wave plate of FIG. 32. This means that the angle at which the half-wave plate 211 and the quarter-wave plate 212 are bonded to each other is not limited to the value shown in FIG. 32. The wideband-wave plate 234 of FIG. 36 converts plane-polarized light to clockwise circularly-polarized light while the wideband-wave plate shown in FIG. 32 converts plane-polarized light to clockwise circularly-polarized light.

This embodiment may be realized by modifying the third embodiment by replacing the quarter-wave plates with the wideband-wave plates. Accordingly, the present optical device works to enlarge an image of the LCD 31 in the same way that the third embodiment does. Owing to uniform characteristics of the retardation plates, the present optical device is superior to the third embodiment in that retardation plates have uniform wavelength characteristics and can reduce noise light in a wide band of wavelengths with an improved S/N-ratio.

The first wideband-wave plate 234 and the first polarizer plate 32 cooperatively act as a circularly-polarizer plate and can widely absorb rays reflected from the half-mirror coated surface of the plano-convex lens 33 with result that reflection at LCD is reduced and a S/N-ratio of an image of the LCD is further improved as compared with the third embodiment.

(Fifth Embodiment)

Figure 37:
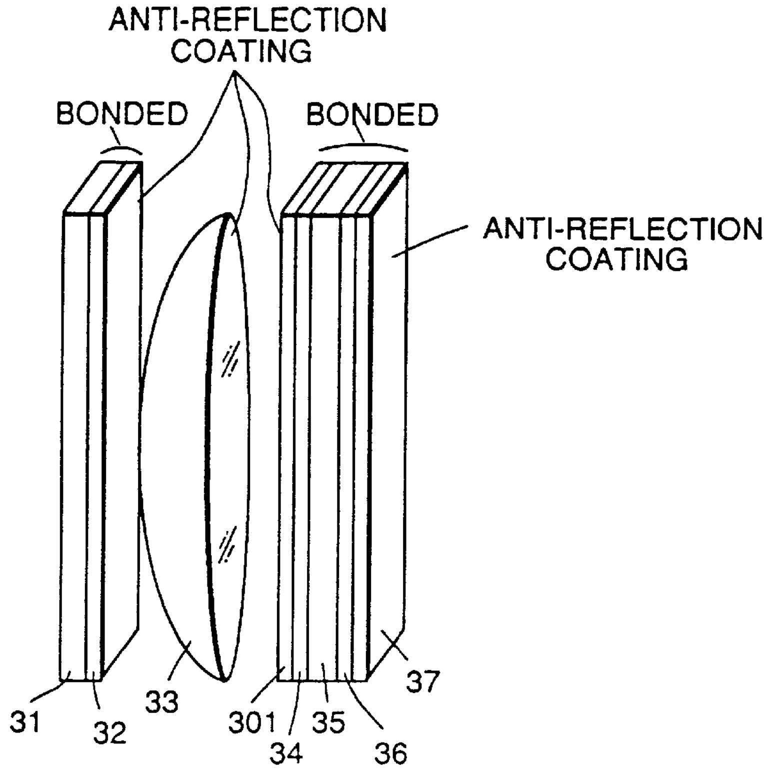
FIG. 37 is a schematic view for explaining an optical device which is a fifth embodiment of the present invention.

The fifth embodiment of the present invention will be described below with reference to FIG. 37 showing an optical device according to the fifth embodiment.

All optical elements composing the optical unit according to the present embodiment are coated with anti-reflection coating. As described before with reference to FIG. 22, the earlier optical device produces noise light by unnecessary reflection at a viewer-side surface of a plano-convex lens 33 and both sides of a first quarter-wave plate 34. To avoid this, the optical components are coated with an anti-reflection layer or bonded to another component with adhesive for optics.

It is said that polycarbonate of the quarter-wave plate may not stably bear an anti-reflection coating. Accordingly, an element 301 made of acrylic sheet with an anti-reflection coating is bonded to each surface of the first quarter-wave plate 34 made of polycarbonate, as shown in FIG. 37.

In this embodiment, a second quarter-wave plate 36 is bonded to a half-mirror 35 (not to a plano-convex lens 33) as shown in FIG. 37, for easy examination of the plano-convex lens 33. Another combination of components to be bonded can be, of course, possible.

As described before with reference to FIG. 23, the earlier optical device produces noise light by unnecessary reflection from the black matrix of the LCD 31. To prevent this, the present embodiment uses a LCD 31 whose black-matrix is coated with a chrome coating, thus reducing the reflectance of the black matrix to 5% or less.

Similarly, the first polarizer plate 32 is bonded to the glass of the LCD 31, as shown in FIG. 37, and has an anti-reflection coating on its surface facing to the plano-convex lens 33 to prevent unnecessary reflection of light therefrom.

Figure 24:
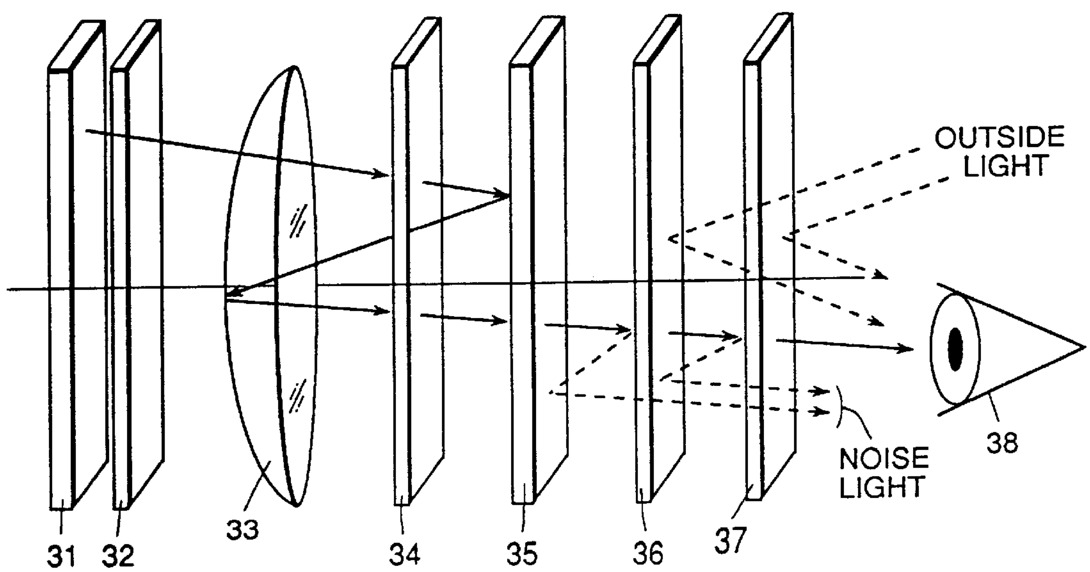
FIG. 24 schematically depicts an earlier optical device.

As described before with reference to FIG. 24, the earlier optical device produces noise light caused by reflection from the second quarter-wave plate 36, the second polarizer plate 37 and the rear surface of the half-mirror 35. To prevent this, as shown FIG. 37, the half-mirror 35, the second quarter-wave plate 36 and the second polarizer plate 37 are bonded to each other and the outside surface of the second polarizer plate 37 is coated with an anti-reflection coating in the present embodiment.

The optical unit of the present embodiment, since its components are coated with anti-reflection coatings, can provide a high-quality image by minimizing noise rays to be caused by unnecessary reflection.

(Sixth Embodiment)

Figure 38:
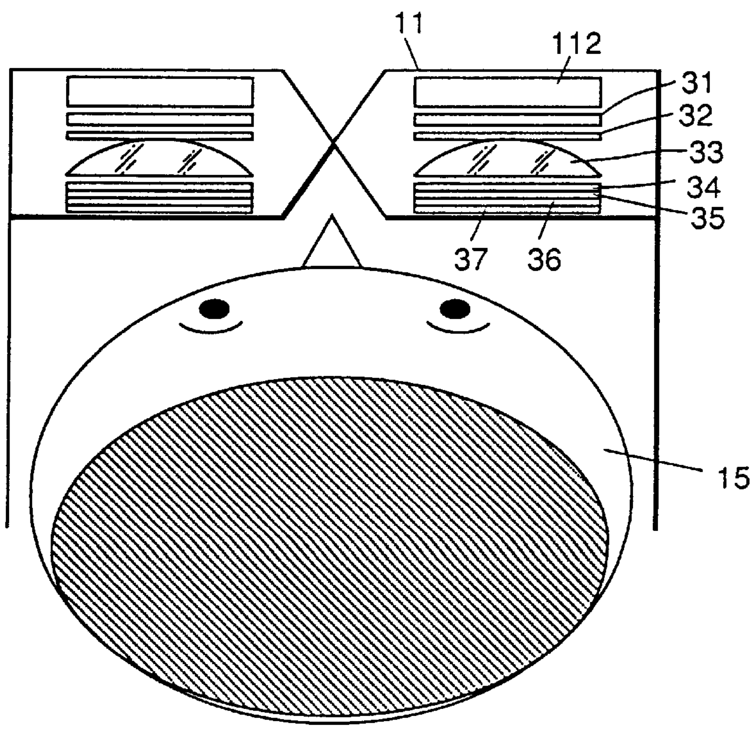
FIG. 38 is a schematic construction plan view for explaining a HMD which is a sixth embodiment of the present invention.
Figure 39:
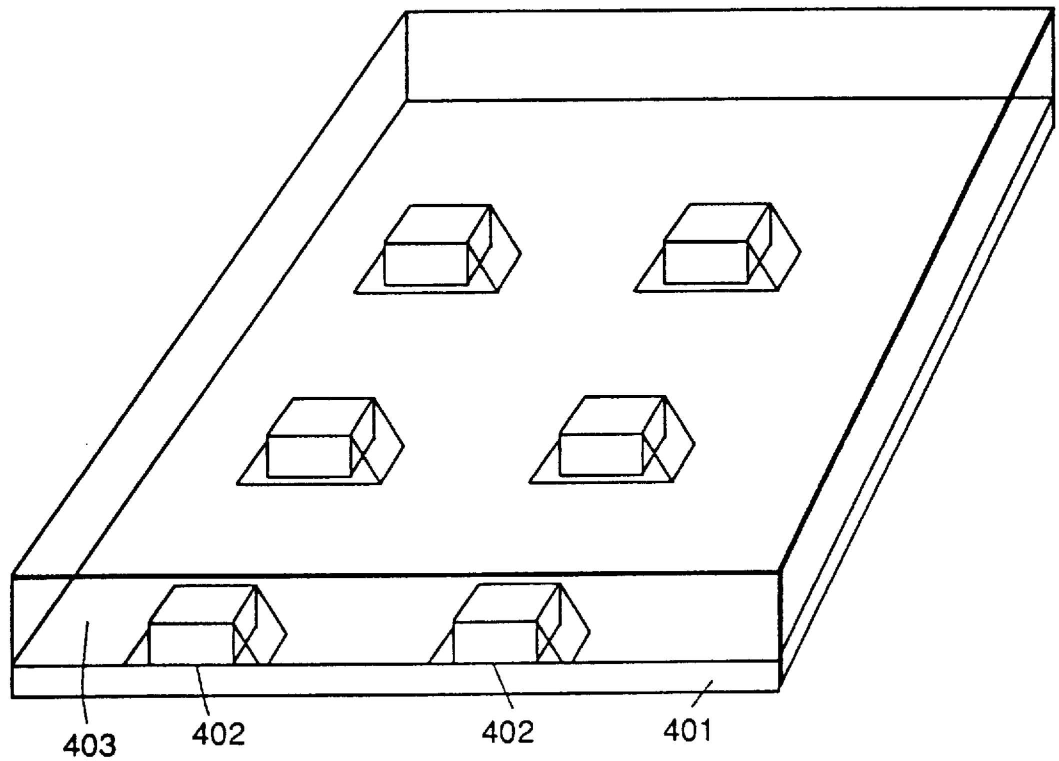
FIG. 39 is a schematic perspective illustration of an essential construction of a back light of the HMD which is the sixth embodiment of the present invention.
Figure 40:
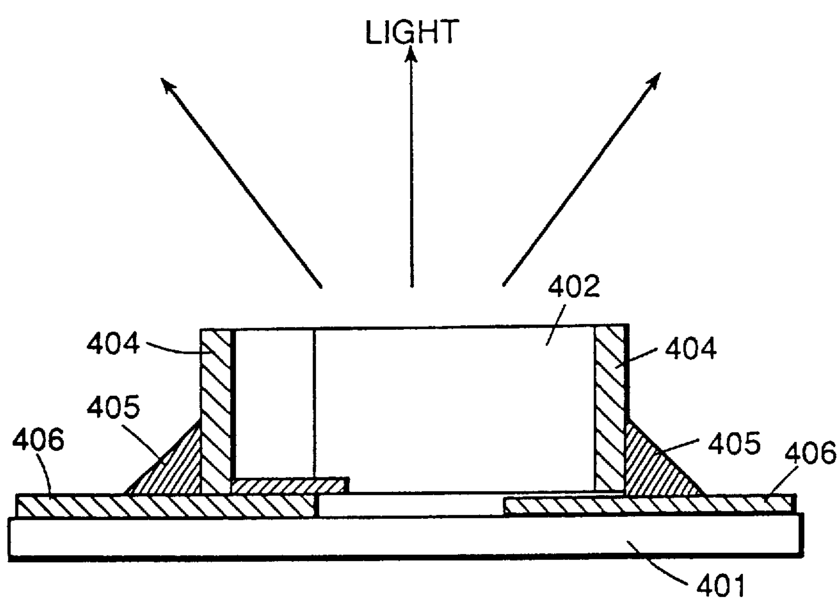
FIG. 40 is a grossly enlarged sectional side view of an essential portion of a back light of the HMD which is the sixth embodiment of the present invention.

Referring to FIGS. 38 to 40, the sixth embodiment of the present invention will be described below:

FIG. 38 is a schematic construction plan view for explaining a HMD embodying the present invention, FIG. 39 is a schematic perspective illustration of an essential portion of a back light of the HMD and FIG. 40 is a grossly enlarged sectional side view of an essential portion of a back light of the HMD.

In this embodiment, as shown in FIGS. 38 and 39, a LCD 31 is provided with a back light 112 that is a substrate 401 whereon a plurality of blue-light-emitting diodes (LED) chips 402 is mounted with a fluorescent-material 403 coated thereon. Adaptively selected fluorescent-material 403 may emit yellow-colored light by illuminated by blue-color light. These two color rays are synthesized to produce white light necessary for the back light.

However, emitting diodes 402 must be densely mounted on the substrate since each diode can emit not sufficiently bright light. Accordingly, an example of designing arrays of these blue-light emitting diodes 402 for a LCD of 1.3 inches in size. A LED 402 is supposed to emit light whose brightness is 40 mcd at a DC forward voltage of 3.6V and a DC forward current of 20 mA.

It is supposed that the back light must have a luminance of 40000 nt (cd/$m^2$). It is simply determined that the LEDs are disposed at intervals of 1 mm on the back light substrate. When a 1.3-inch panel is of 26 mm in length and 20 mm in width, a total luminous intensity is determined as 40×26×20=20800 mcd=20.8 cd. Accordingly, a luminance is determined as 20.8 cd÷520×$10^{-6}$$m^2$=40000 nt. The required conditions can be obtained.

It is difficult to mount the blue LED chips at intervals of 1 mm on the substrate by a usual wire bonding method. In this embodiment, as shown in FIG. 40, electrode terminals 404 are disposed one at each side of each blue LED 402 and bonded with conductive adhesive 405 onto respective wiring patterns 406 on a substrate 401.

As described above, the HMD according to the present embodiment uses a LCD 31 with an LED type back light 112 that, in comparison with a conventional cold-cathode-tube type back light, has a very small heat-radiation and no need of using an inverter, assuring thereby savings in size and weight and eliminating the possibility of causing noise light of electromagnetic wave. Thus the HMD with the LED back-light is smaller (thin) and lighter and comfortable to mount on the head.

In the optical systems according to embodiments 1 to 5, light passes a plurality of times the half-mirror, resulting in decreasing the transmittance. Application of the LED type back light 112 enables the HMD to easily obtain a high luminance and therefore to supply a bright image through its low-transmittance optical system.

Although the embodiments of the present invention are described with a LCD 31 used as a display device, it is also possible to use an electroluminescent display (ELD) which has no need of back-lighting and provides a wide visual angle of an image. The use of the ELD can therefore offer further savings in thickness and weight of the HMD that can also realize an increased uniformity of brightness and color of an image.

The ELD is applied with its black-matrix having anti-reflection coating as described before for LCD 31. This reduces an amount of noise rays caused by reflection from the black matrix of the ELD, improving the quality of an image to be produced.

However, the ELDs available today is inferior in resolution than the LCDs. Accordingly, the ELD is selected where the priority is given to saving in thickness of the HMD than the resolution.

As is apparent from the foregoing description, the image display devices according to the present invention offer the following advantages:

An optical device according to the present invention is characterized in that it uses a reflecting and refracting device having a half-mirror coating, which is made of a copolymerized macromolecular material having positive and negative photoelastic coefficients relative to an internal stress. Namely, adaptive copolymerization of the macromolecular materials eliminates the possibility of double refraction. The reflecting and refracting device allows light to pass therethrough not without being disturbed in its polarized state, eliminating the possibility of directly transmitting noise light from the LCD to the user's eye. Thus, signal light is not affected by the noise light and can produce an image having an improved S/N ratio.

Another optical device according to the present invention is characterized in that the first second quarter-wave plates have refractive power in their thickness direction, which value lies within a maximal refractive index and a minimal refractive index within the plate surface. Thus the first quarter-wave plate and the second quarter-wave plate can suppress a change in retardation of light slanted into respective plates, reducing noise rays that may obliquely entering the user's eye and surrounds an image produced by signal light.

Another optical device according to the present invention is characterized in that has the first and second quarter-wave plates are disposed with their stretch-giving axes intersecting each other at right angles. The first and second quarter-wave plates thus arranged can cooperatively cancel the retardation of light passing therethrough. Namely, light from the first polarizer plate passes the first and second quarter-wave plates and becomes to have polarization direction corresponding to the transmission axis direction of the first polarizer plate. Thus the second polarizer plate disposed with its transmission axis normally intersecting the transmission axes of the first polarizer plate can absorb light rays that may be directly transmitted from the LCD to the user's eye.

Another optical device according to the present invention is characterized in that the second quarter-wave plate and the second polarizer plate cooperatively work as a circularly polarizer plate that can absorb external noise light reflected from the half-mirror, improving a S/N-ratio of an image formed by signal light having passed the system.

Another optical device according to the present invention is characterized in that the first quarter-wave plate and the second polarizer plate cooperatively work as a circularly polarizer plate that can absorb light reflected from the reflecting and refracting means, thus reducing reflection from the LCD with improving a S/N-ratio of an image formed by signal light having passed the device.

Another optical device according to the present invention uses wide-band-wave plates each of which is composed of a half-wave plate and a quarter-wave plate bonded to each other and having axes intersecting with each other. The application of the above-mentioned wide-band-wave plates can considerably prevent a change of characteristics with wavelengths, thus improving a S/N-ratio in the range of wavelengths deviated from the designed value.

Another optical device according to the present invention is characterized in that half-wave plate are made of the same kind of material and at least either one of wave-plates satisfies a condition $n_x > n_z > n_y$ where $n_x$, $n_z$ and $n_y$ are refractive indexes in orthogonal directions and thickness direction, respectively, in a plane of the wave-plate. This wave plate can prevent a change in retardation of slanting incident light to thereto, thus reducing the slanting light that may be visible by the user's eye as noise at periphery of an image to be formed by signal light. This improves a S/N-ratio of an image to be provided.

Another optical device according to the present invention is characterized in that an angle "p" formed between optical axes of the quarter-wave plate and the half-wave plate is larger than 50 degrees and smaller than 70 degrees. This construction can further improve the uniformity of wavelength characteristics of the wide-band-wave plate, thus increasing a S/N-ratio of an image to be provided by the device.

Another optical device according to the present invention is characterized in that the second wide-band-wave plate and the second polarizer plate cooperatively work as a wide-band-wave circularly polarizer plate that can absorb wide-band external noise light reflected from the half-mirror, thus improving a S/N-ratio of an image formed by signal light having passed the device.

Another optical device according to the present invention is characterized in that the first wide-band-wave plate and the first polarizer plate cooperatively work as a wide-band-wave circularly polarizer plate that can absorb wide-band noise light reflected from reflecting and refracting device, thus improving a S/N-ratio of an image formed by signal light having passed the device.

Another optical device according to the present invention is characterized in that the optical components have an anti-reflection coat, thus reducing an amount of noise light resulted from unnecessary reflection.

Another optical device according to the present invention is characterized in that the optical components are bonded to each other with adhesive for optics, thus reducing an amount of noise light resulted from unnecessary reflection.

An HMD according to the present invention is composed of any one of the above-mentioned optical device, a back light and a liquid-crystal display (LCD). It has a wide-field angle and is a thin and light to comfortably wear and can provide a high-quality image.

Another HMD according to the present invention is characterized in that a black-matrix contained in the liquid crystal display has been subjected to anti-reflection processing. This feature can reduce an amount of noise light caused by reflection on the LCD, thus realizing a further improved image quality of the HMD.

Another HMD according to the present invention is characterized by using a light-emitting diode (LED) as a back light for liquid-crystal display. The HMD may be more compact and comfortable to use since the LED back light is thin and light. This LED back-light radiates a very small amount of heat and can easily attain a high brightness. The application of this back light enables the HMD to provide a bright image.

Another HMD according to the present invention comprises any one of the above-mentioned optical devices and an electroluminescent display (ELD). In comparison with a HMD with a LCD display, this HMD has no need of using a back light and may be further compact.

Another HMD according to the present invention is characterized in that a black-matrix contained in the electroluminescent display has been subjected to anti-reflection processing. This feature can reduce an amount of noise light caused by reflection on the ELD, thus attaining a further improved image quality of the HMD.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An optical device including:

a first polarizer plate disposed at an incident side;

a second polarizer plate disposed at an outgoing side; and a half-mirror-coated reflecting-refracting device, a first quarter-wave plate, a half-mirror, and a second quarter wave plate disposed between the first and second polarizer plates, wherein the reflecting-refracting device is prepared from a copolymer of high-molecular compounds having positive and negative photoelastic coefficients with respect to an inner stress, and wherein the optical components are coated on one side with an anti-reflection coating.

2. An optical device including:

a first polarizer plate disposed at an incident side;

a second polarizer plate disposed at an outgoing side; and a half-mirror-coated reflecting-refracting device, a first quarter-wave plate, a half-mirror, and a second quarter-wave plate disposed between the first and second polarizer plates, wherein the first quarter-wave plate and the second quarter-wave plate have refractive indicies in a thickness direction thereof and said refractive indicies lie between a minimal value and a maximal value of the refractive indices in a surface plane direction of the quarter wave-plates, and wherein the optical components are coated on one side with an anti-reflection coating.

3. An optical device including:

a first polarizer plate disposed at an incident side;

a second polarizer plate disposed at an outgoing side; and a half-mirror-coated reflecting-refracting device, a first quarter-wave plate, a half-mirror, and a second quarter wave plate disposed between the first and second polarizer plates, wherein the first quarter-wave plate and the second quarter-wave plate are disposed with stretch-giving axes thereof being normal to each other, and wherein the optical components are coated on one side with an anti-reflection coating.

4. An optical device as defined in any one of claims 1 to 3, wherein the first polarizer plate, the reflecting-refracting device, the first quarter-wave plate, the half-mirror, the second quarter-wave plate and the second polarizer plate are disposed in order from the incident side.

5. An optical device as defined in any one of claims 1 to 3, wherein the first polarizer plate, the first quarter-wave plate, the reflecting-refracting device, the second quarter-wave plate, the half-mirror and the second polarizer plate are disposed in order from the incident side.

6. An optical device comprising:

a first polarizer plate disposed at an incident side;

a second polarizer plate disposed at an outgoing side; and a half-mirror-coated reflecting-refracting device, a first wide-band-wave plate, a half-mirror, and a second wide-band-wave plate disposed between the first and second polarizer plates, wherein the first wide-band-wave plate and the second wide-band-wave plate are each prepared from a quarter-wave plate and a half-wave plate with intersecting optical axes, bonded together.

7. An optical device comprising:

a first polarizer plate disposed at an incident side;

a second polarizer plate disposed at an outgoing side; and a half-mirror-coated reflecting-refracting device, a first wide-band-wave plate, a half-mirror, and a second wide-band-wave plate disposed between the first and second polarizing plates, wherein the first wide-band-wave plate and the second wide-band-wave plate are each prepared from a quarter-wave plate and a half-wave plate with intersecting optical axes, bonded together and made of the same material, and wherein at least one of wave-plates satisfies a condition $n_x>n_z>n_y$, where $n_x$, $n_z$ and $n_y$ are refractive indicies in orthogonal directions and a thickness direction, respectively, in a plane of the wave-plate.

8. An optical device as defined in claim 6 or 7, wherein an angle "p", formed between optical axes of the quarter-wave plate and the half-wave plate, is larger than 50 degrees and smaller than 70 degrees.

9. An optical device as defined in claim 6 or 7, wherein the first polarizer plate, the reflecting-refracting device, the first wide-band-wave plate, the half-mirror, the second wide-band-wave plate and the second polarizer plate are disposed in order from the incident side.

10. An optical device as defined in claim 6 or 7, wherein the first polarizer plate, the first wide-band-wave plate, the reflecting-refracting device, the second wide-band-wave plate, the half-mirror and the second polarizer plate are disposed in order from the incident side.

11. An optical device including:

a first polarizer plate disposed at an incident side;

a second polarizer plate disposed at an outgoing side; and a half-mirror-coated reflecting-refracting device, a first quarter-wave plate, a half-mirror, and a second quarter wave plate disposed between the first and second polarizer plates, wherein the reflecting-refracting device is prepared from a copolymer of high-molecular compounds having positive and negative photoelastic coefficients with respect to an inner stress, and wherein one pair of the optical components is bonded together with an adhesive for optics.

12. A head-mounted display device comprising:

an optical device including, a first polarizer plate disposed at an incident side, a second polarizer plate disposed at an outgoing side, and a half-mirror-coated reflecting-refracting device, a first quarter-wave plate, a half-mirror, and a second quarter wave plate disposed between the first and second polarizer plates, wherein the reflecting-refracting device is prepared from a copolymer of high-molecular compounds having positive and negative photoelastic coefficients with respect to an inner stress;

an illuminating device; and a liquid crystal display.

13. A head-mounted display device as defined in claim 12, wherein a black-matrix of the liquid crystal display is provided with an anti-reflection coating.

14. A head-mounted display device as defined in claim 12, wherein the illuminating device includes a substrate with a light-emitting diode chip, an electrode, and a fluorescent material applied on the substrate.

15. A head-mounted display device comprising:

an optical device including, a first polarizer plate disposed at an incident side, a second polarizer plate disposed at an outgoing side, and a half-mirror-coated reflecting-refracting device, a first quarter-wave plate, a half-mirror, and a second quarter wave plate disposed between the first and second polarizer plates, wherein the reflecting-refracting device is prepared from a copolymer of high-molecular compounds having positive and negative photoelastic coefficients with respect to an inner stress, and an electroluminescent display.

16. A head-mounted display device as defined in claim 15, wherein a black-matrix of the electroluminescent display is provided with an antireflection coating.

17. The optical device defined in any one of claims 6 and 7, wherein the optical device is a head-mounted display device which further comprises a liquid crystal display.

18. A head-mounted display device as defined in claim 17, wherein a black-matrix of the liquid crystal display is provided with an anti-reflection coating.

19. An optical device including:

a first polarizer plate disposed at an incident side;

a second polarizer plate disposed at an outgoing side; and a half-mirror-coated reflecting-refracting device, a first quarter-wave plate, a half-mirror, and a second quarter-wave plate disposed between the first and second polarizer plates, wherein the first quarter-wave plate and the second quarter-wave plate have refractive indicies in a thickness direction thereof and said refractive indicies lie between a minimal value and a maximal value of the refractive indices in a surface plane direction of the quarter wave-plates, and wherein one pair of the optical components is bonded together with an adhesive for optics.

20. A head-mounted display device, comprising:

an optical device including, a first polarizer plate disposed at an incident side, a second polarizer plate disposed at an outgoing side, and a half-mirror-coated reflecting-refracting device, a first quarter-wave plate, a half-mirror, and a second quarter-wave plate disposed between the first and second polarizer plates, wherein the first quarter-wave plate and the second quarter-wave plate have refractive indicies in a thickness direction thereof and said refractive indicies lie between a minimal value and a maximal value of the refractive indices in a surface plane direction of the quarter wave-plates;

an illuminating device; and a liquid crystal display.

21. A head-mounted display device, comprising:

an optical device including, a first polarizer plate disposed at an incident side, a second polarizer plate disposed at an outgoing side, and a half-mirror-coated reflecting-refracting device, a first quarter-wave plate, a half-mirror, and a second quarter-wave plate disposed between the first and second polarizer plates, wherein the first quarter-wave plate and the second quarter-wave plate have refractive indicies in a thickness direction thereof and said refractive indicies lie between a minimal value and a maximal value of the refractive indices in a surface plane direction of the quarter wave-plates, and wherein the reflecting-refracting device is prepared from a copolymer of high-molecular compounds having positive and negative photoelastic coefficients with respect to an inner stress; and an electroluminescent display.

22. An optical device including:

a first polarizer plate disposed at an incident side, a second polarizer plate disposed at an outgoing side, and a half-mirror-coated reflecting-refracting device, a first quarter-wave plate, a half-mirror, and a second quarter wave plate disposed between the first and second polarizer plates, wherein the first quarter-wave plate and the second quarter-wave plate are disposed with stretch-giving axes thereof being normal to each other, and wherein the optical components are coated on one side with an anti-reflection coating, wherein one pair of the optical components is bonded together with an adhesive for optics.

23. A head-mounted display device, comprising:

an optical device including, a first polarizer plate disposed at an incident side, a second polarizer plate disposed at an outgoing side, and a half-mirror-coated reflecting-refracting device, a first quarter-wave plate, a half-mirror, and a second quarter wave plate disposed between the first and second polarizer plates, wherein the first quarter-wave plate and the second quarter-wave plate are disposed with stretch-giving axes thereof being normal to each other, and wherein the optical components are coated on one side with an anti-reflection coating;

an illuminating device; and a liquid crystal display.

24. A head-mounted display device, comprising:

an optical device including, a first polarizer plate disposed at an incident side, a second polarizer plate disposed at an outgoing side, and a half-mirror-coated reflecting-refracting device, a first quarter-wave plate, a half-mirror, and a second quarter wave plate disposed between the first and second polarizer plates, wherein the first quarter-wave plate and the second quarter-wave plate are disposed with stretch-giving axes thereof being normal to each other, and wherein the optical components are coated on one side with an anti-reflection coating; and an electroluminescent display.

* * * * *